US010955361B2

(12) United States Patent
Urano et al.

(10) Patent No.: US 10,955,361 B2
(45) Date of Patent: Mar. 23, 2021

(54) DEFECT INSPECTION APPARATUS AND PATTERN CHIP

(71) Applicant: HITACHI HIGH-TECH CORPORATION, Tokyo (JP)

(72) Inventors: Yuta Urano, Tokyo (JP); Toshifumi Honda, Tokyo (JP); Akio Yazaki, Tokyo (JP); Yukihiro Shibata, Tokyo (JP); Hideki Fukushima, Tokyo (JP); Yasuhiro Yoshitake, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 0 days.

(21) Appl. No.: 16/628,381

(22) PCT Filed: Jul. 18, 2017

(86) PCT No.: PCT/JP2017/025929
§ 371 (c)(1),
(2) Date: Jan. 3, 2020

(87) PCT Pub. No.: WO2019/016856
PCT Pub. Date: Jan. 24, 2019

(65) Prior Publication Data
US 2020/0182804 A1 Jun. 11, 2020

(51) Int. Cl.
*G01N 21/956* (2006.01)
*G01N 21/47* (2006.01)
(Continued)

(52) U.S. Cl.
CPC ........... *G01N 21/956* (2013.01); *G01N 21/47* (2013.01); *G01N 21/9501* (2013.01); *G06T 7/0004* (2013.01); *G06T 2207/30148* (2013.01)

(58) Field of Classification Search
CPC .. G01N 21/47; G01N 21/9501; G01N 21/956; G01N 21/95623; G06T 2207/30148; G06T 7/0004
See application file for complete search history.

(56) References Cited

U.S. PATENT DOCUMENTS 5,369,430 A 11/1994 Kitamura
5,864,394 A 1/1999 Jordan, III et al.
(Continued)

FOREIGN PATENT DOCUMENTS

JP 5-137047 6/1993
JP 2005-129345 A 5/2005
(Continued)

*Primary Examiner* — Michelle M Iacoletti
(74) *Attorney, Agent, or Firm* — Miles & Stockbridge, P.C.

(57) ABSTRACT

As a technique to improve processing efficiency of defect inspection by quickly adjusting a position of a detection system, provided is a defect inspection apparatus including: a stage that moves with a sample and a pattern substrate placed thereon; an illumination optical system that irradiates an object on the stage from a direction inclined from the normal direction of the pattern substrate; a first detection optical system that detects scattered light in the normal direction; a second detection optical system that detects scattered light in a direction different from the scattered light detected by the first detection optical system; a signal processing unit that processes both scattered light signals; and a control unit. The control unit implements first adjustment processing of adjusting a focal position of the first or the second detection optical system and a three-dimensional position of each detector with respect to an illumination region by using a scattered light signal and second adjustment processing of adjusting a focal point by changing a position in an optical axis direction of a detector of the first or the second detection optical system and a position in a
(Continued)

height direction of the stage, and implements the second adjustment processing at a higher frequency than the first adjustment processing.

6 Claims, 16 Drawing Sheets

(51) Int. Cl.
*G01N 21/95* (2006.01)
*G06T 7/00* (2017.01)

(56) References Cited

U.S. PATENT DOCUMENTS

| | | |
|---|---|---|
| 7,239,389 B2 | 7/2007 | Baer et al. |
| 7,365,834 B2 | 4/2008 | Lewis et al. |
| 7,421,109 B2 | 9/2008 | Tsuchiya et al. |
| 7,643,137 B2 | 1/2010 | Sugihara et al. |
| 8,989,479 B2 | 3/2015 | Gao et al. |
| 9,047,711 B2 | 6/2015 | Cho et al. |
| 9,329,137 B2 | 5/2016 | Shibata et al. |
| 2005/0139789 A1 | 6/2005 | Nagano et al. |
| 2006/0245635 A1 | 11/2006 | Ishikawa |
| 2006/0290930 A1 | 12/2006 | Nishiyama et al. |
| 2007/0229811 A1 | 10/2007 | Sanada |
| 2008/0246966 A1 | 10/2008 | Oomori et al. |
| 2008/0273193 A1 | 11/2008 | Nishiyama et al. |
| 2009/0002695 A1 | 1/2009 | Saito et al. |
| 2011/0026017 A1 | 2/2011 | Hayano |
| 2012/0274931 A1 | 11/2012 | Otani et al. |
| 2013/0242294 A1 | 9/2013 | Taniguchi et al. |
| 2014/0002826 A1 | 1/2014 | Inoue et al. |
| 2014/0315330 A1 | 10/2014 | Fujimori |
| 2015/0109434 A1 | 4/2015 | Jingu |
| 2016/0011123 A1* | 1/2016 | Shibata ............ H04N 5/2256 356/237.5 |

FOREIGN PATENT DOCUMENTS

| | | |
|---|---|---|
| JP | 2006-47308 A | 2/2006 |
| JP | 2007-298501 A | 11/2007 |
| JP | 2011-009554 A | 1/2011 |
| JP | 2012-21994 A | 2/2012 |
| JP | 2014-174052 A | 9/2014 |
| WO | 2017/149689 A1 | 9/2017 |

* cited by examiner

[FIG. 1]
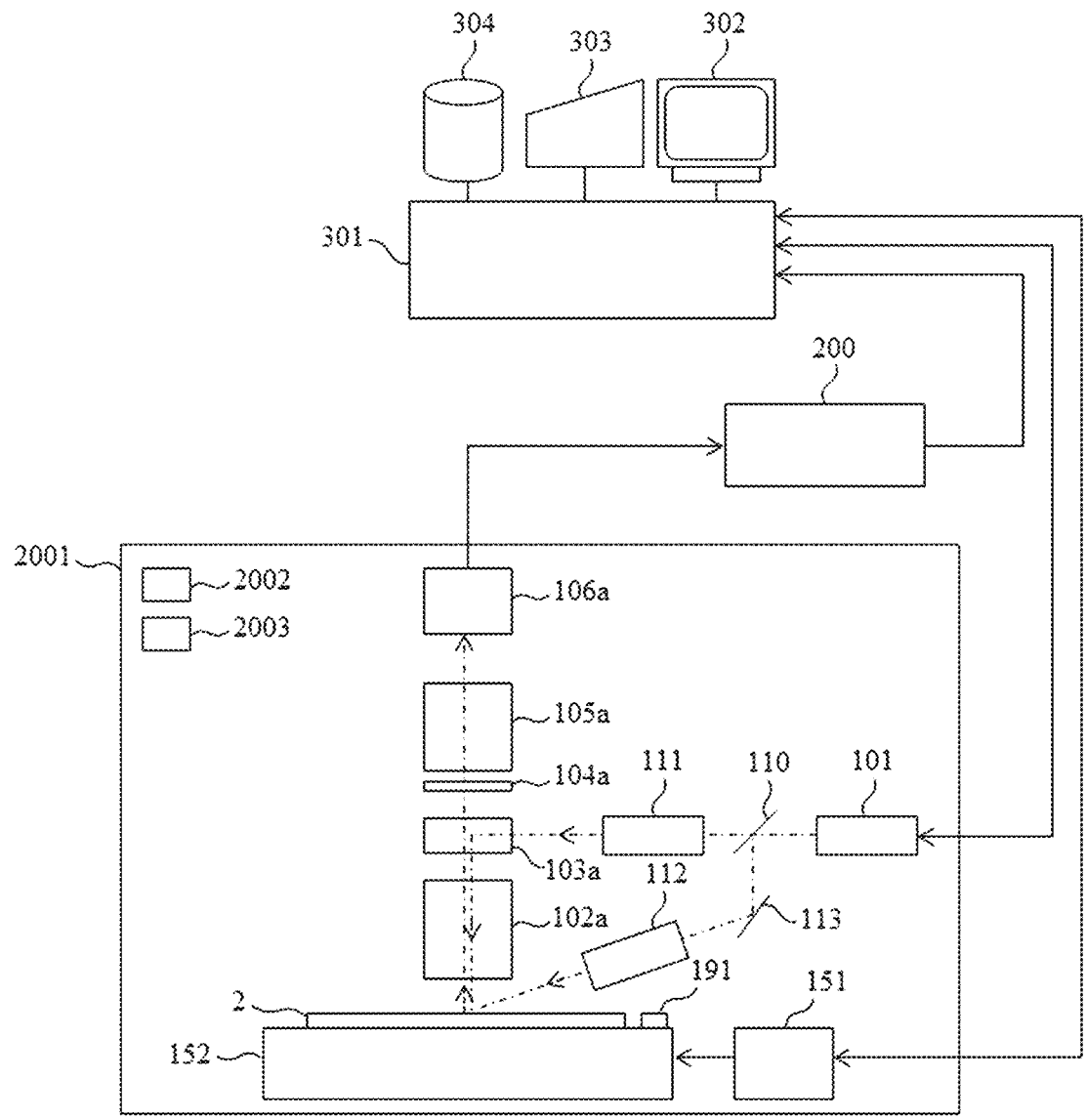

[FIG. 2]
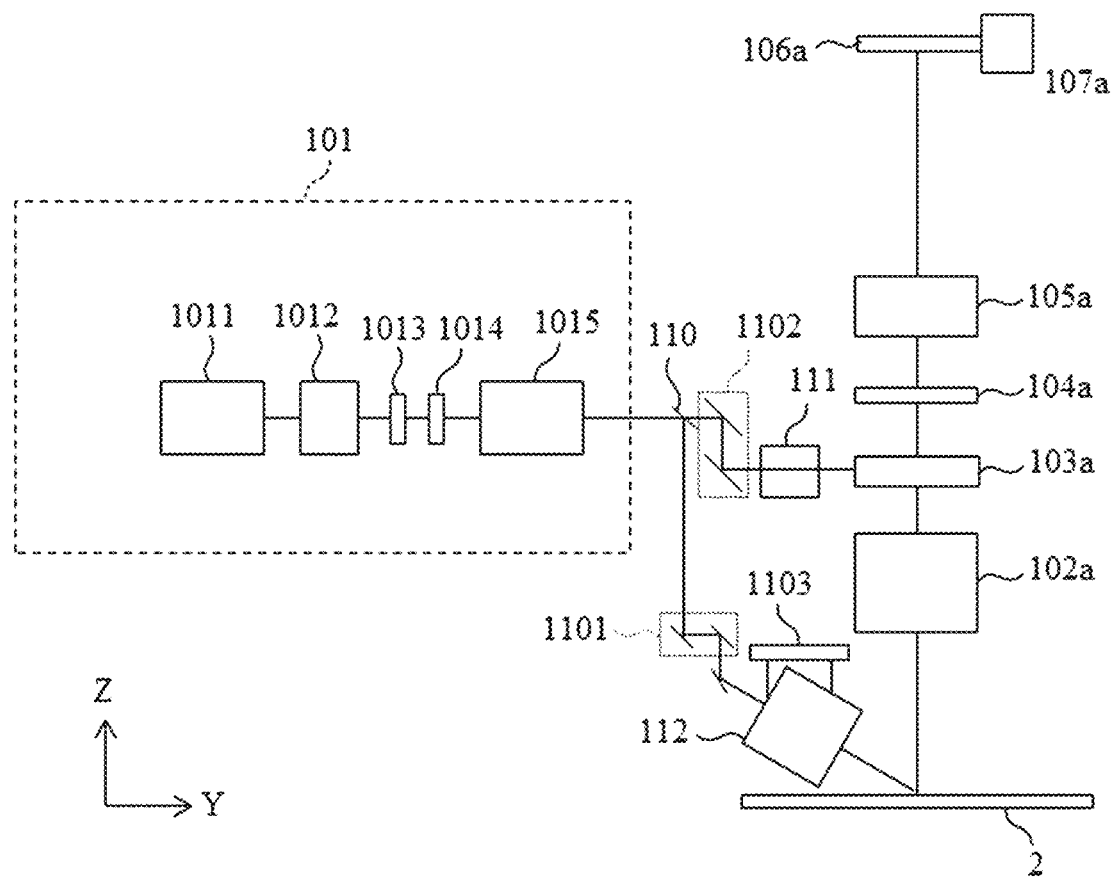

[FIG. 3]
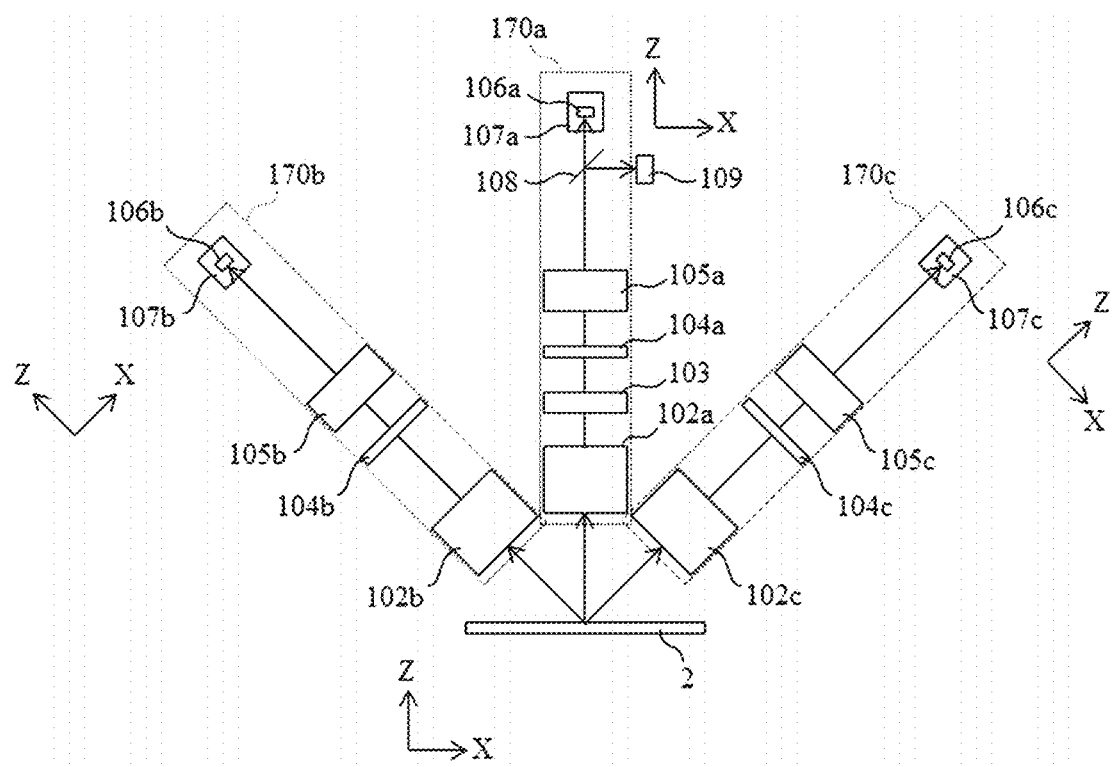

[FIG. 4]
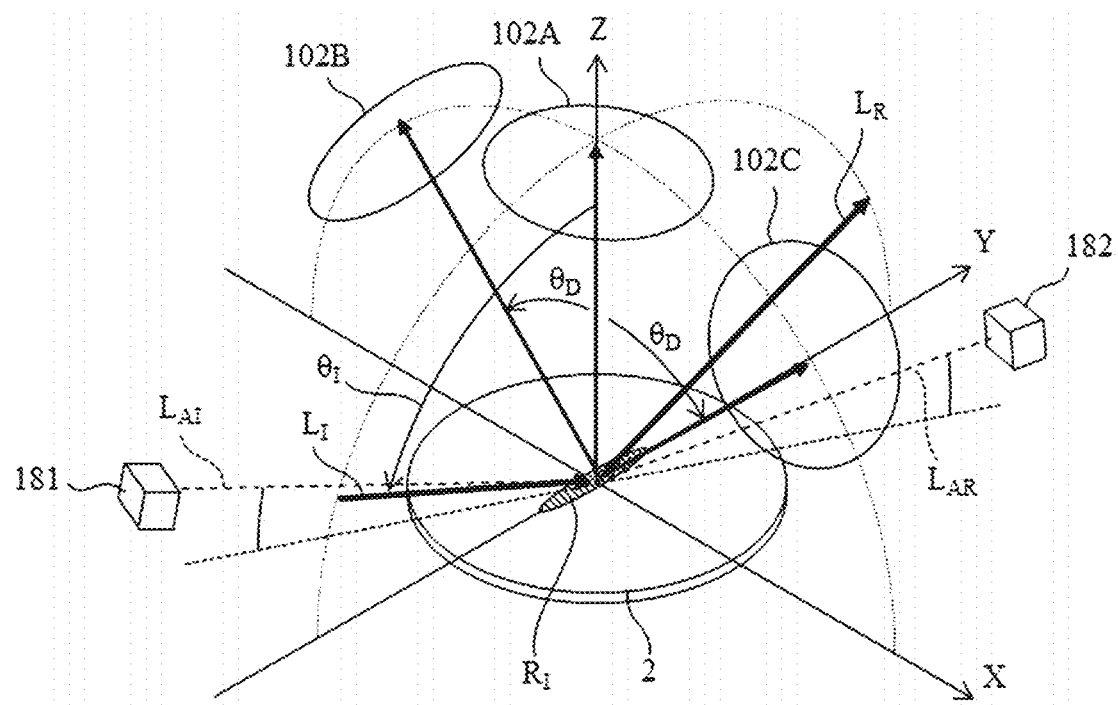

[FIG. 5]
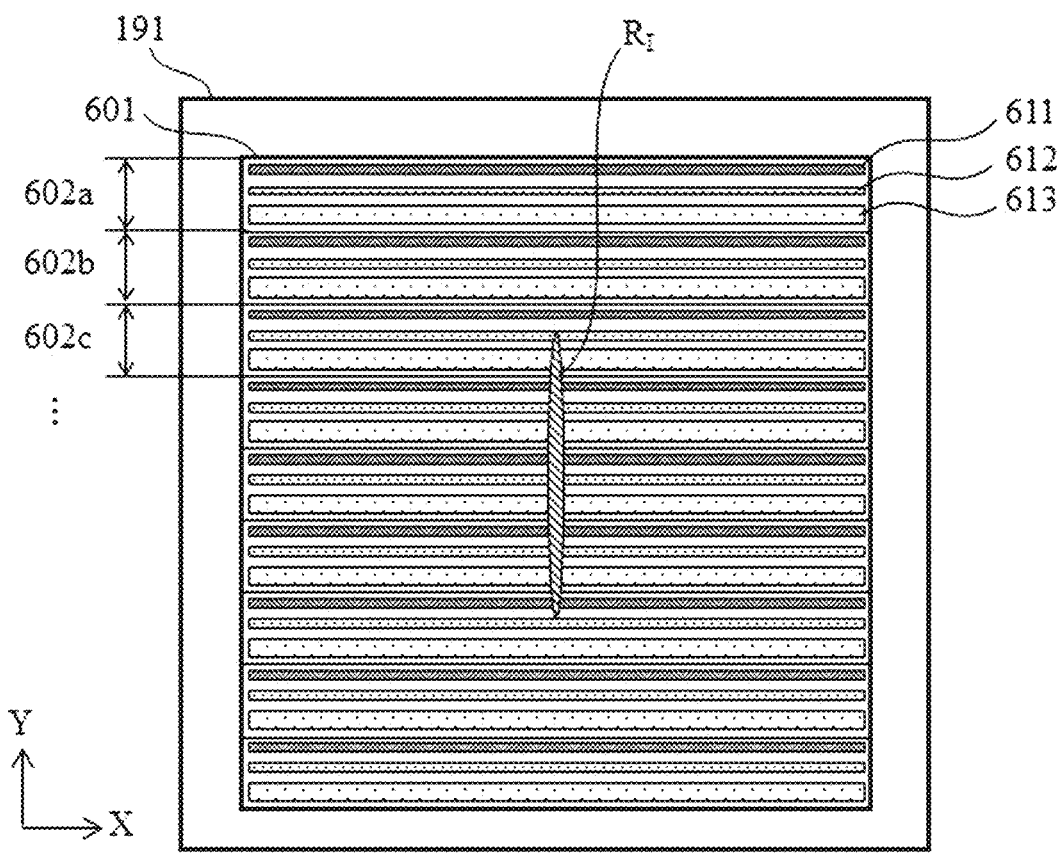
[FIG. 6]
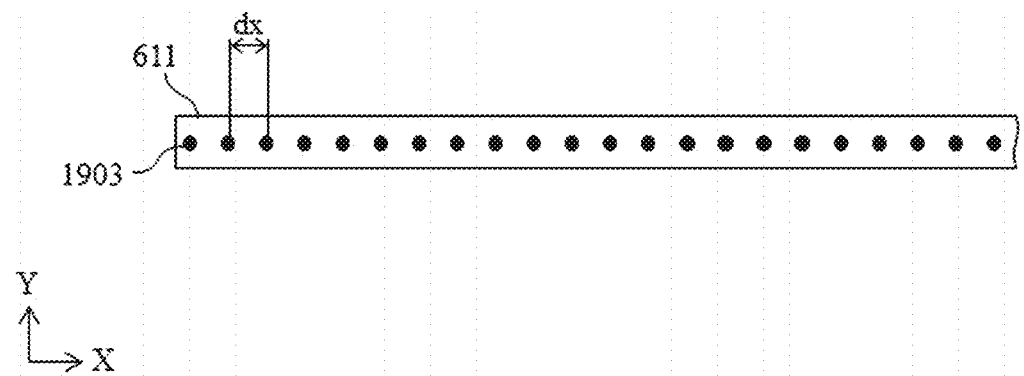

[FIG. 7]
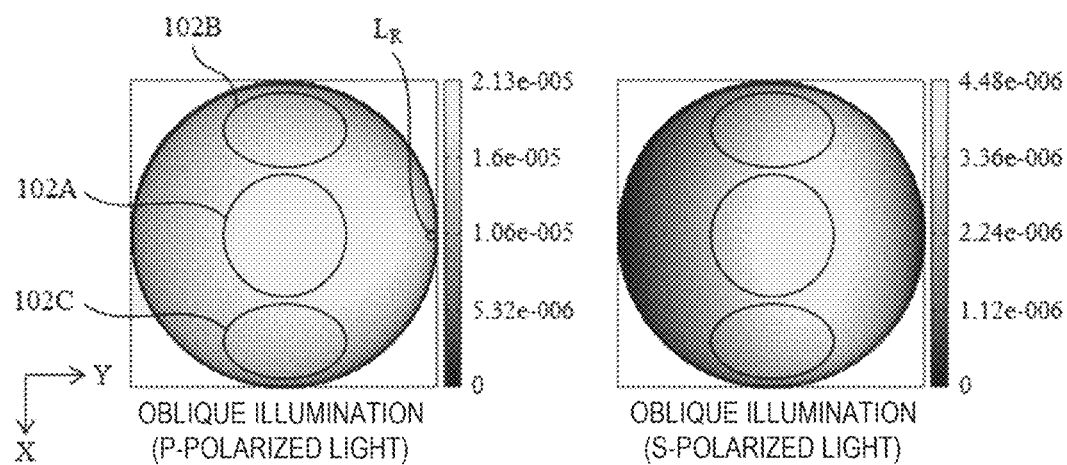

[FIG. 8]
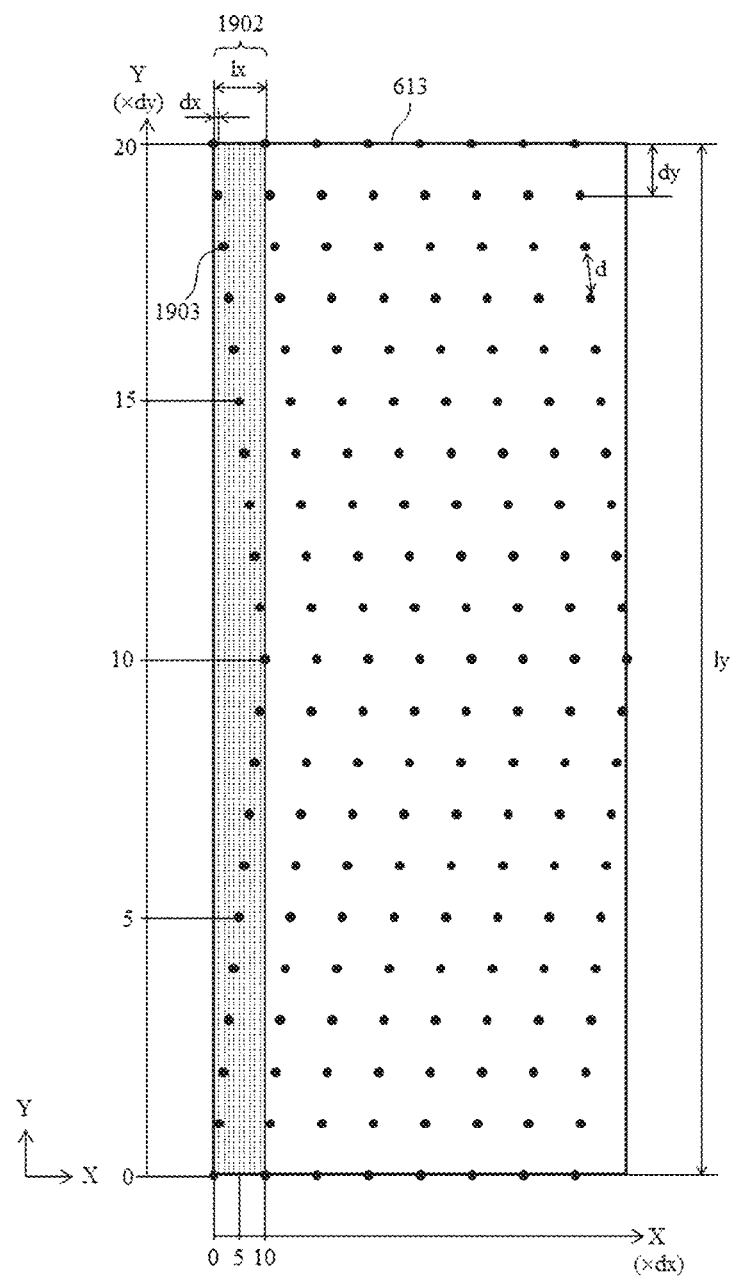

[FIG. 9]
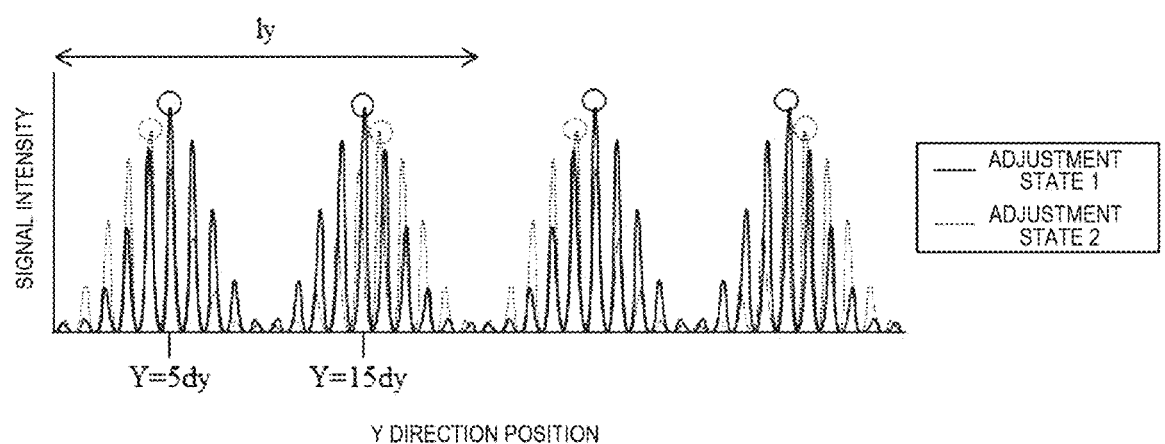

[FIG. 10]
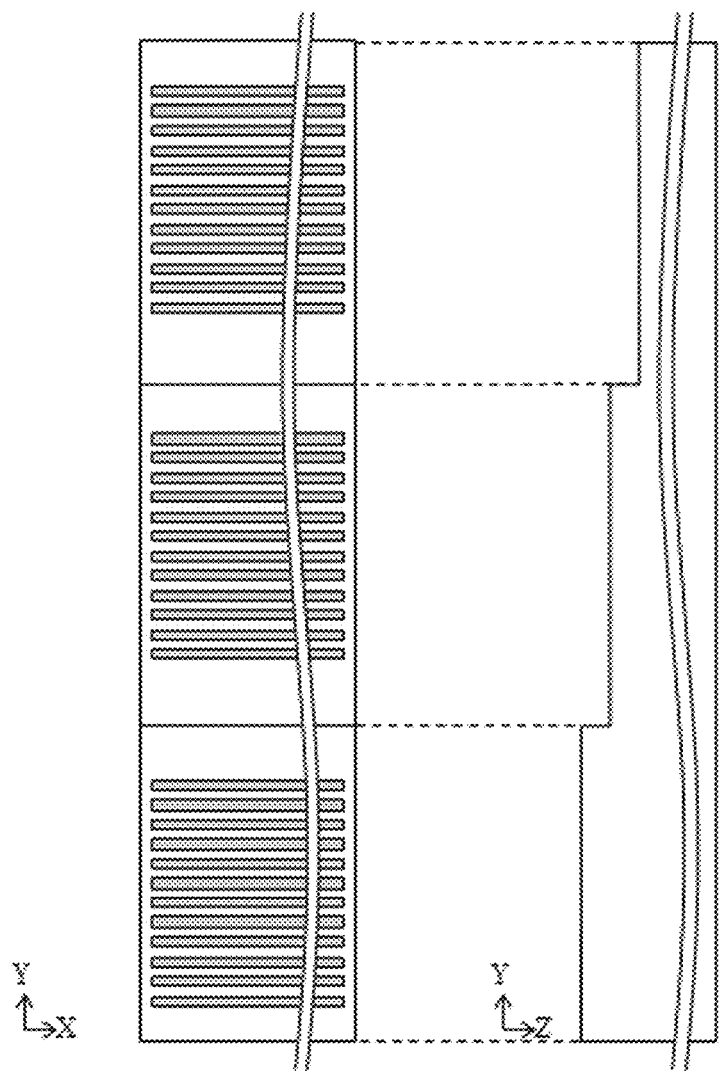

[FIG. 11]
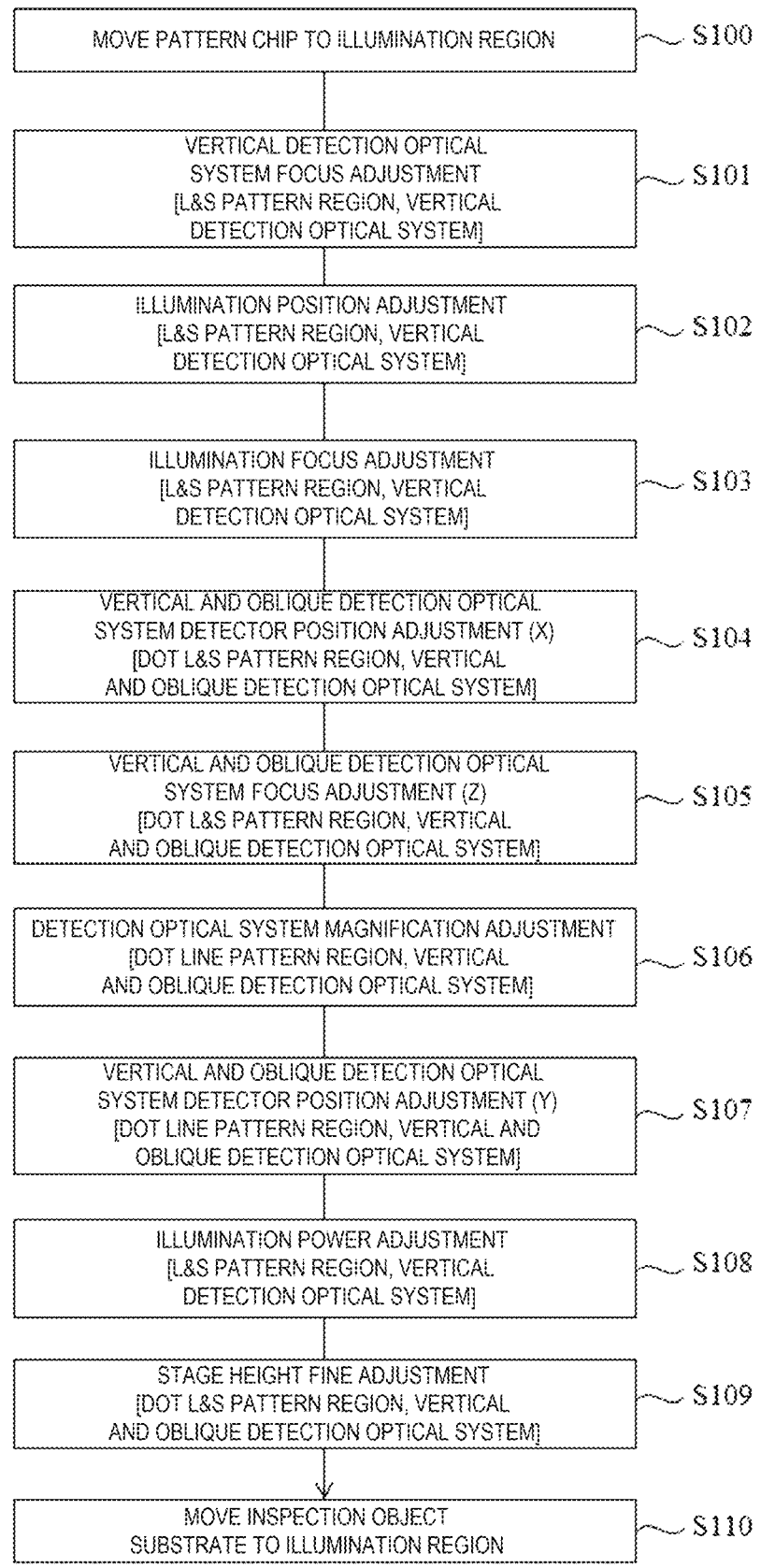

[FIG. 12]
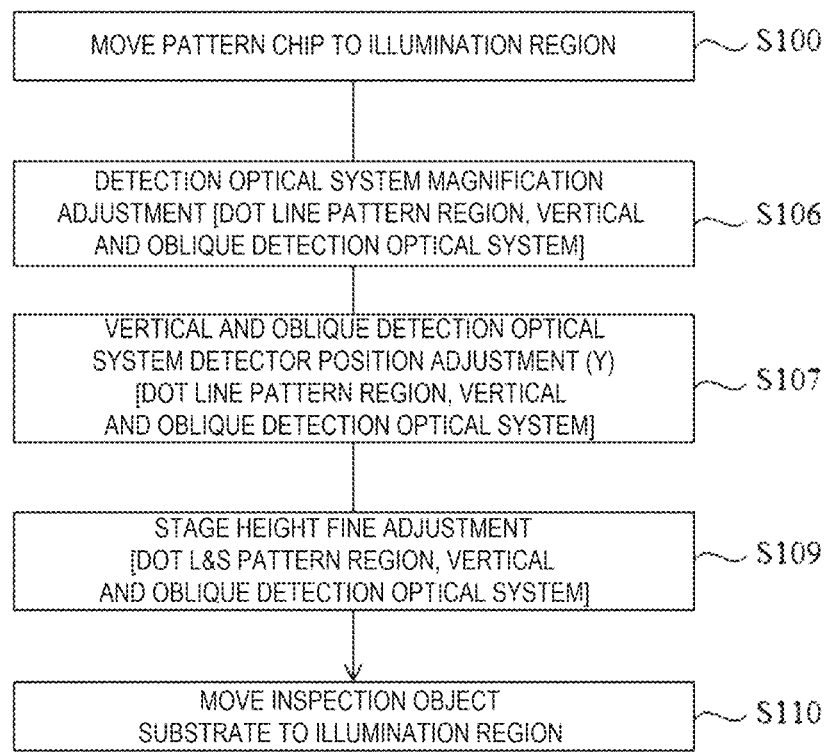

[FIG. 13]
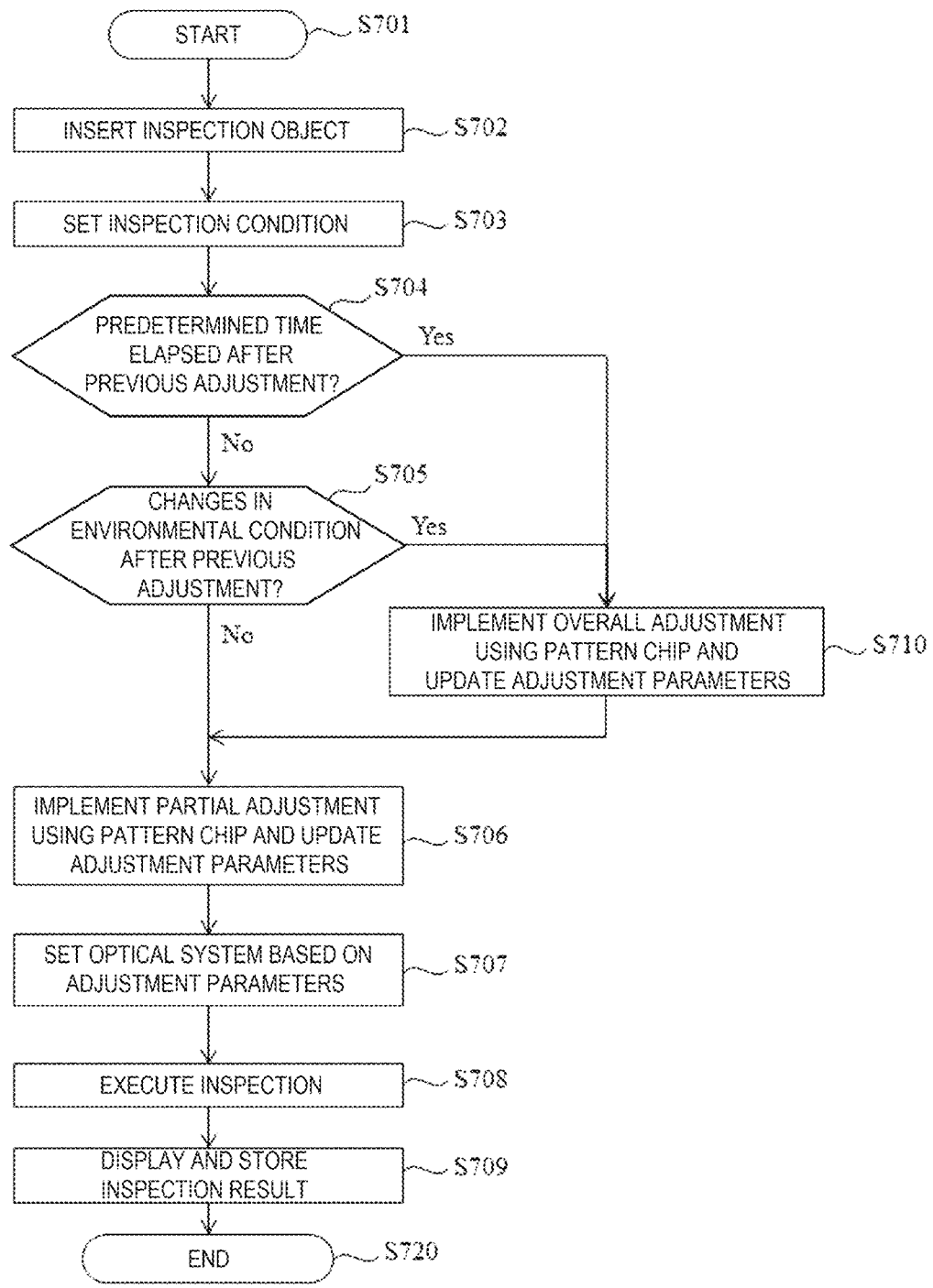

[FIG. 14]
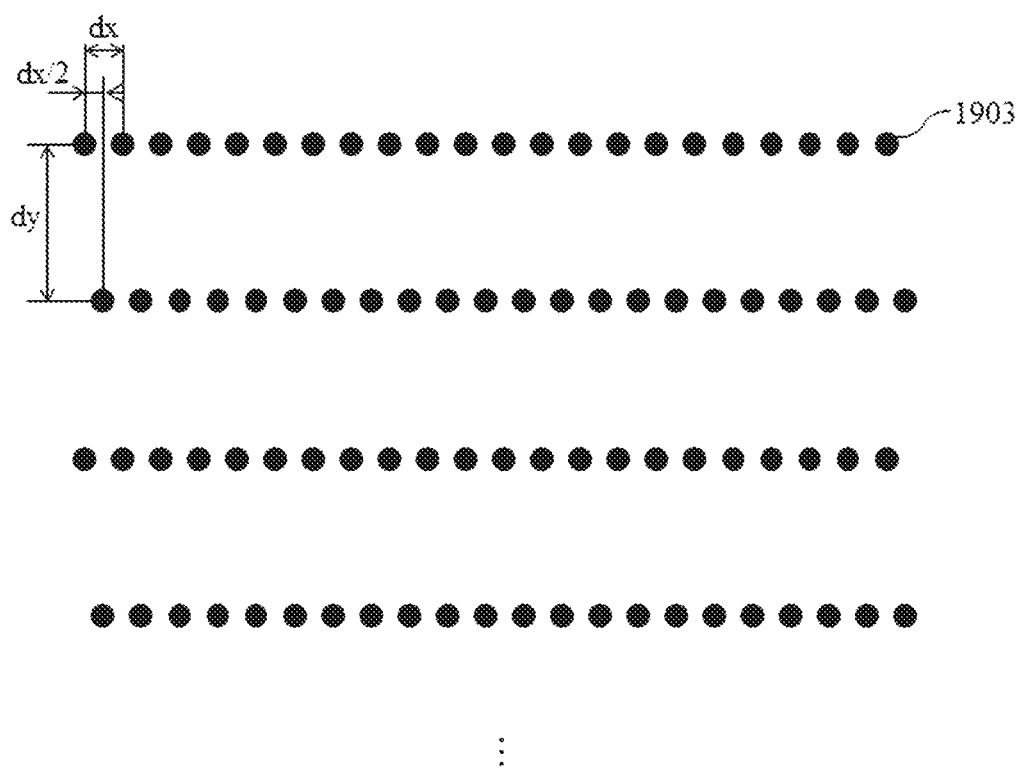

[FIG. 15]
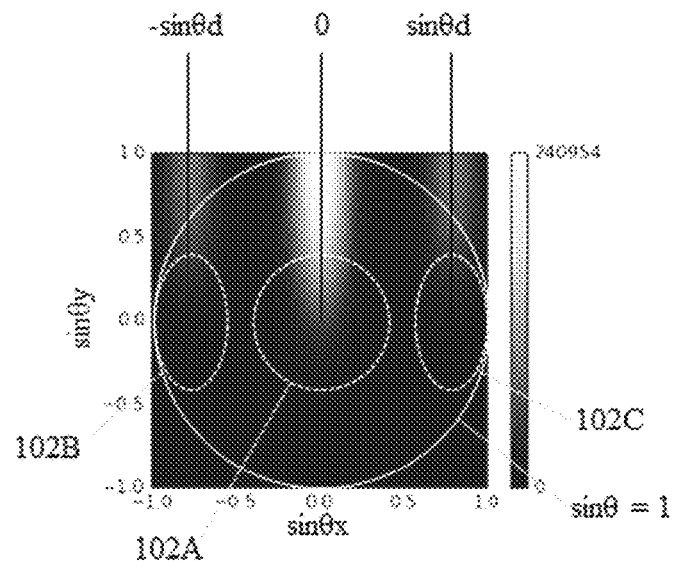
[FIG. 16]
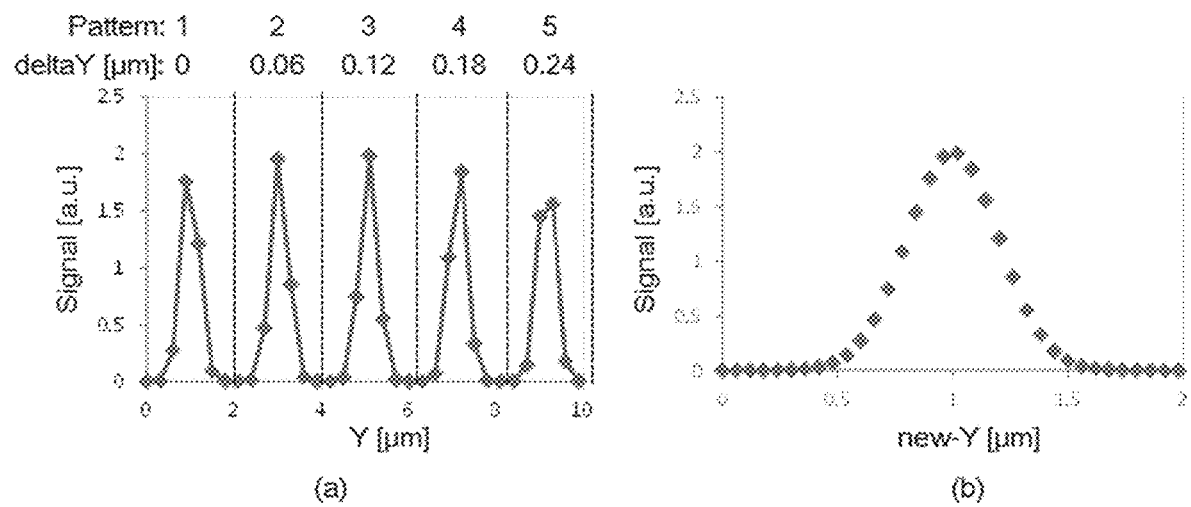

[FIG. 17]
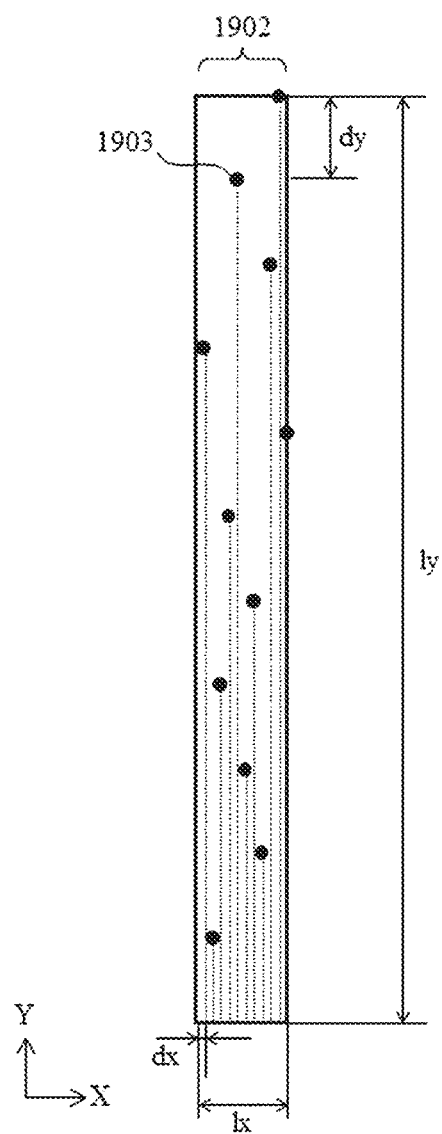

[FIG. 18]
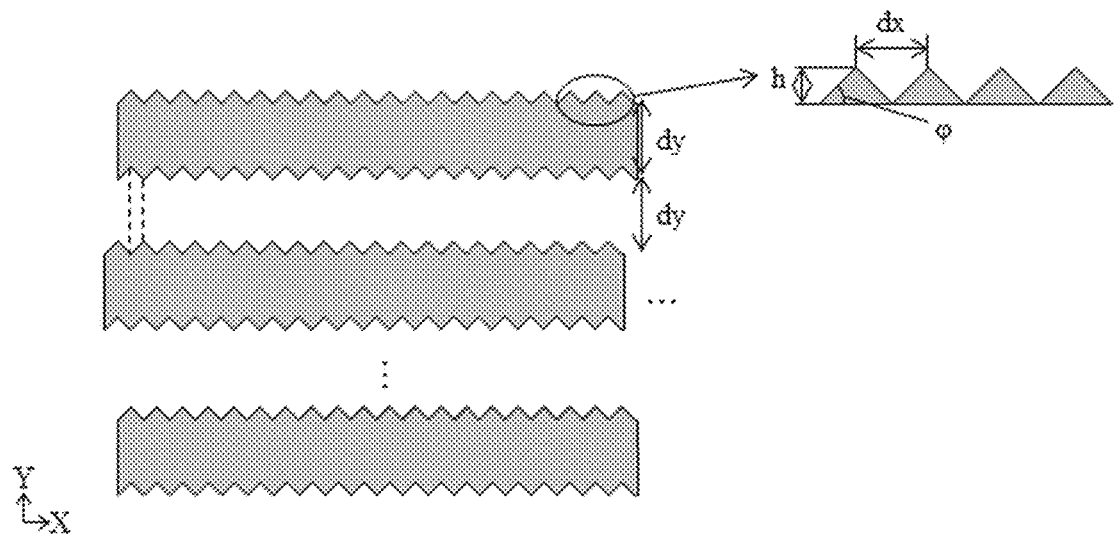
[FIG. 19]
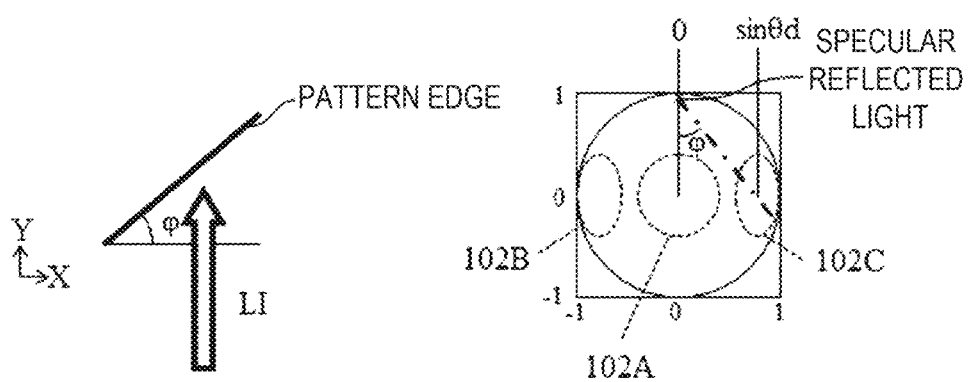

DEFECT INSPECTION APPARATUS AND PATTERN CHIP

TECHNICAL FIELD

The present invention relates to a defect inspection apparatus and a pattern chip.

BACKGROUND ART

PTL 1 discloses that "a defect inspection apparatus that inspects a sample includes: a table portion capable of moving with a sample and a pattern chip to be inspected placed thereon; an illumination light irradiation unit that emits illumination light linearly formed on a surface of the sample or a surface of the pattern chip placed on the table portion; a detection optical system unit that detects on each image sensor an image formed by scattered light incident on respective objective lenses of a plurality of detection optical systems, which each include an objective lens and an image sensor and are arranged at a plurality of locations above the table portion, among scattered light generated from the sample irradiated with the illumination light linearly formed by the illumination light irradiation unit; and a signal processing unit that processes a signal detected by the plurality of detection optical systems of the detection optical system unit and detects a defect on the sample surface. In the pattern chip, a plurality of repeating patterns for generating scattered light corresponding to positions of respective objective lenses of the plurality of detection optical systems of the detection optical system unit when the linearly formed illumination light is emitted by the illumination light irradiation unit are periodically formed."

RELATED ART LITERATURE

Patent Literature

PTL 1: JP-A-2014-174052

SUMMARY OF INVENTION

Technical Problem

In the above technique, a plurality of repeating patterns for generating scattered light are used when a position of a detection system is adjusted. However, it is necessary to adjust the position each time measurement is performed. Accordingly, it may take an excessive amount of time to adjust the position precisely even if the patterns of the above technique are used. In particular, in a defect inspection apparatus for inspecting defects generated in a pattern of an object, a pattern chip used in the defect inspection apparatus, and a defect inspection method executed by the defect inspection apparatus, it is necessary to accurately perform a large amount of inspection with high accuracy in accordance with the flow of an inspection object. Accordingly, an inspection process may not be established when the time required for position adjustment is long.

An object of the invention is to provide a technique for improving processing efficiency of defect inspection by performing sufficient position adjustment of a detection system quickly.

Solution to Problem

The present application includes a plurality of methods for solving at least a part of the problems described above, and examples thereof are as follows. In order to solve the above problems, a defect inspection apparatus of the invention includes a stage that moves with a sample and a pattern substrate to be inspected placed thereon, an illumination optical system that emits illumination light having a shape of being incident on an object on the stage from a direction inclined from a normal direction of the pattern substrate and extending in a first direction on the pattern substrate, a first detection optical system that forms an image on a first detector and detects scattered light generated in the normal direction by irradiation of the illumination light, a second detection optical system that forms an image on a second detector and detects scattered light emitted in a direction different from a direction of the scattered light detected by the first detection optical system among the scattered light, a signal processing unit that processes a scattered light signal detected by the first detection optical system and the second detection optical system, and a control unit. The control unit implements first adjustment processing of adjusting a focal position of the first detection optical system or the second detection optical system and a three-dimensional position of each detector with respect to an illumination region of the illumination light by using the scattered light signal obtained in each of the first detection optical system and the second detection optical system, and second adjustment processing of adjusting a focal point by changing a position in an optical axis direction of a detector of the first detection optical system or the second detection optical system and a position in a height direction of the stage by using the scattered light signal. The control unit implements the second adjustment processing at a higher frequency than the first adjustment processing.

Advantageous Effect

According to the invention, an abnormality can be notified by learning data serving as a standard according to an actual condition. Problems, configurations, and effects other than the above will become apparent from description of embodiments below.

BRIEF DESCRIPTION OF DRAWINGS

FIG. 1 is a schematic view showing a defect inspection apparatus according to a first embodiment.

FIG. 2 is a side view showing a detailed configuration of an illumination optical system and a vertical detection optical system according to the first embodiment.

FIG. 3 is a side view showing a configuration and arrangement of the detection optical system in the first embodiment.

FIG. 4 is a perspective view showing a positional relationship between an incidence direction of oblique illumination on an inspection object substrate and detection directions of a plurality of detection optical systems.

FIG. 5 is a plan view showing a configuration example of a pattern chip used in the first embodiment.

FIG. 6 is a plan view showing a configuration example of a dot line pattern region used in the first embodiment.

FIG. 7 is a diagram showing a color map of a scattered light distribution calculation result by dots of the pattern chip used in the first embodiment and an aperture position of the detection optical system.

FIG. 8 is a plan view showing a configuration example of a dot L&S pattern region used in the first embodiment.

FIG. 9 is a diagram showing a waveform of a detection signal obtained from the dot L&S pattern region of the pattern chip according to the first embodiment.

FIG. 10 is a plan view and cross-sectional view showing a step of the L&S pattern region used in the first embodiment.

FIG. 11 is a flowchart showing an overall adjustment procedure of an optical system using the pattern chip according to the first embodiment.

FIG. 12 is a flowchart showing a partial adjustment procedure of the optical system using the pattern chip according to the first embodiment.

FIG. 13 is a flowchart showing an inspection procedure including adjustment of the optical system by the defect inspection apparatus according to the first embodiment.

FIG. 14 is a plan view showing a configuration example of a dot L&S pattern region used in a second embodiment.

FIG. 15 is a schematic view showing a relationship between a diffracted light distribution by the dot L&S pattern region used in the second embodiment and an aperture position of a detection optical system.

FIG. 16 is a diagram showing a waveform of a detection signal obtained by signal reconstruction of a dot L&S pattern region used in a third embodiment.

FIG. 17 is a plan view showing a configuration example of a dot L&S pattern region used in a fourth embodiment.

FIG. 18 is a plan view showing a configuration example of a bending L&S pattern region used in a fifth embodiment.

FIG. 19 is an explanatory diagram of edge angle optimization of the bending L&S pattern used in the fifth embodiment.

DESCRIPTION OF EMBODIMENTS

A first embodiment of the invention will be described below with reference to FIGS. 1 to 5. It should be noted that the invention is not limited to the first embodiment, and in all the drawings for showing the embodiment, the same members are denoted by the same reference numerals in principle, and repetitive descriptions thereof will be omitted. Further, in the embodiment described below, it is needless to say that a constituent element (including an element step) is not always indispensable unless otherwise stated or except a case of being apparently indispensable in principle. In addition, it is needless to say that expressions "formed of A", "formed by A", "having A", and "including A" do not exclude elements other than A unless otherwise stated that A is the only element thereof. Similarly, in the following embodiments, when referring to shapes of constituent elements, positional relationships thereof, and the like, it is assumed that substantially approximate or similar shapes and the like are included unless otherwise stated or except a case where it is conceivable that they are apparently excluded in principle.

For example, a semiconductor device, a liquid crystal display element, and a printed substrate have a manufacturing process of forming a pattern on a substrate. In the manufacturing process, a defect inspection apparatus that detects a defect occurrence state is used in an inspection process in order to inspect a defect generated at the time of forming the pattern and perform a countermeasure. As described above, PTL 1 discloses a defect inspection apparatus capable of stably matching a focal point of illumination light and focal points of a plurality of detection systems within respective focal depths. The pattern chip disclosed in PTL 1 has a pattern corresponding to a detection system in an oblique direction, and the pattern is a line and space pattern (hereinafter referred to as an L&S pattern) which is not orthogonal to the longitudinal direction of an illumination beam that is long in one direction.

When adjusting a focal position using the pattern chip disclosed in PTL 1, in focal position adjustment operation of the detection system in the oblique direction, a region having a limited width in which an illumination region of linear illumination light having a predetermined width and the line and space pattern overlap is detected as an image. In the technique described in PTL 1, it is necessary to measure a spread amount and changes in peak intensity due to image defocus for adjustment. However, in an image obtained by the detection system in the oblique direction, the image width required for adjustment may not be appropriate, changes in the image may be small since a defocus amount is small, and the adjustment may not be performed with high accuracy.

(1) First Embodiment

FIG. 1 shows a configuration example of a defect inspection apparatus 1000 according to the first embodiment. The defect inspection apparatus 1000 includes a light source unit 101, a TTL illumination optical system 111, an oblique illumination optical system 112, an objective lens 102a, an objective pupil optical unit 103a, a polarizer 104a, an imaging lens 105a, a detector 106a, a signal processing unit 200, an overall control unit 301, a display unit 302, a calculation unit 303, a storage unit 304, a stage driving unit 151, an X-Y-Z-θ stage 152 (hereinafter referred to as a "stage 152"), and a pattern chip 191. The objective lens 102a, the objective pupil optical unit 103a, the polarizer 104a, the imaging lens 105a, and the detector 106a are arranged so that an optical path is a normal direction of an inspection object substrate 2 in order to observe the inspection object substrate 2 from the normal direction.

Illumination light emitted from the light source unit 101 is reflected by a mirror 110 so that the optical path is bent toward a mirror 113. The illumination light incident on the mirror 113 is further reflected and incident on the oblique illumination optical system 112. The oblique illumination optical system 112 linearly collects the incident illumination light. The linearly collected illumination light irradiates the inspection object substrate 2 obliquely from above. Here, the mirror 110 can be moved in and out of the optical path of the illumination light emitted from the light source unit 101. When the mirror 110 moves away from the optical path of the illumination light, the illumination light is incident on the TTL illumination optical system 111. The illumination light incident on the TTL illumination optical system 111 is collected linearly and incident on the objective pupil optical unit 103 so that the optical path is bent in the direction of the objective lens 102. The illumination light passing through the objective lens 102 irradiates the inspection object substrate 2 from the normal direction thereof.

Specular reflected light, diffracted light, and scattered light (hereinafter collectively referred to as "reflected light") generated by irradiating the inspection object substrate 2 with the oblique illumination light passing through the oblique illumination optical system 112 or the vertical illumination light passing through the TTL illumination optical system 111 are incident on an objective lens 102 and collected and then imaged on a detection surface of a detector 106 through an objective pupil optical unit 103, a polarizer 104, and an imaging lens 105 in this order, and are converted into electric signals. The polarizer 104 is arranged between the imaging lens 105 and the detector 106 and may also be arranged immediately before the detector 106. The polarizer 104 includes a rotation mechanism and a mechanism that retracts to the outside of the optical axis. The polarizer 104 can be set to an arbitrary detection angle by the rotation mechanism. With the retracting mechanism, use and non-use of the polarizer 104 can be switched.

The electric signals output from the detector 106 is input to the signal processing unit 200. The signal processing unit 200 includes a computer as a basic configuration. That is, the signal processing unit 200 includes an input and output device, a storage device, a control device, a calculation device, and the like. The signal processing unit 200 determines the presence or absence of a defect by comparing an electric signal corresponding to an inspection region with an electric signal obtained from another region on the inspection object substrate 2, and outputs information of a detected defect. A feature amount and position information of the defect including signal intensity of the defect detected by the signal processing unit 200 are stored in the storage unit 304 via the overall control unit 301 and are displayed on the display unit 302. The inspection object substrate 2 is scanned by the stage 152 driven by the stage driving unit 151 and the entire surface is inspected.

FIG. 1 shows only one detection optical system (the objective lens 102, the objective pupil optical unit 103, the imaging lens 105, and the detector 106) of the defect inspection apparatus 1000. In practice, a plurality of detection optical systems are installed such that objective lenses 102 do not interfere with each other mechanically. "a" in the end of reference numerals in the drawing indicates that the objective lens 102, the objective pupil optical unit 103, the imaging lens 105, and the detector 106 belong to a certain detection optical system (a "system a" in the normal direction of the inspection object substrate 2). Therefore, in practice, the signal processing unit 200 processes a plurality of electric signals detected through a plurality of detection optical systems to determine a defect.

In an intra-apparatus space 2001 where an illumination optical system and a detection optical system are installed, a thermometer 2002 and a barometer 2003 that monitor temperature and pressure are installed, and a measurement value of the environmental state of the intra-apparatus space 2001 is constantly output to the overall control unit 301. Amore detailed configuration of the illumination optical system and the detection optical system is shown in FIG. 2.

FIG. 2 is a side view showing a detailed configuration of the illumination optical system and a vertical detection optical system according to the first embodiment. The light source unit 101 includes a laser light source 1011, an attenuator 1012, an ND filter 1013, a wave plate 1014, and a beam expander 1015. A laser output from the laser light source 1011 is adjusted in output by the attenuator 1012, adjusted in light amount by the ND filter 1013, adjusted in polarization state by the wave plate 1014, adjusted and controlled in beam diameter and shape by the beam expander 1015, and is emitted as illumination light.

The optical path of the illumination light emitted from the light source unit 101 is guided to the TTL illumination optical system 111 or the oblique illumination optical system 112 depending on the presence or absence of the mirror 110. That is, when the mirror 110 moved by a driving device (not shown) is installed at a position deviated from the optical path of the illumination light, the illumination light emitted from the light source unit 101 is incident on the TTL illumination optical system 111 through the mirror unit 1102. On the other hand, when the mirror 110 moved by the driving device (not shown) is installed on the optical path of the illumination light, the illumination light emitted from the light source unit 101 is reflected by the mirror 110 and incident on a mirror unit 1101, and is further reflected by the mirror unit 1101 and incident on the oblique illumination optical system 112. The illumination light that is incident on the TTL illumination optical system 111 or the oblique illumination optical system 112 is formed into a light beam that is long in one direction, and then emitted from the TTL illumination optical system 111 or the oblique illumination optical system 112.

The laser light source 1011 is suitable fora laser having short wavelength, high output, high brightness, high stability using a third, fourth, or fifth harmonic (having a wavelength of 355, 266, and 213 nm, respectively) of a YAG laser. An angle and a position of the illumination light incident on the oblique illumination optical system 112 or the TTL illumination optical system 111 are controlled by the mirror unit 1101 or 1102 respectively and are adjusted so that the illumination light is irradiated to a desired position on the inspection object substrate 2. Each of the mirror units 1101 and 1102 includes a plurality of plane mirrors, and the angle and position of the illumination light are adjusted by adjusting the angles and positions of the plane mirrors.

FIG. 3 is a side view showing a configuration and arrangement of the detection optical system in the first embodiment. FIG. 3 shows an arrangement relationship of a plurality of detection optical systems. A vertical detection optical system 170a includes the objective lens 102a, the polarizer 104a, the imaging lens 105a, and the detector 106a. The vertical detection optical system 170a detects reflected light by forming on the detector 106a an image of the reflected light collected by the objective lens 102a after being generated from the inspection object substrate 2. A left oblique detection optical system 170b includes an objective lens 102b, a polarizer 104b, an imaging lens 105b, and a detector 106b. The left oblique detection optical system 170b detects reflected light by forming on the detector 106b an image of the reflected light collected by the objective lens 102b after being generated from the inspection object substrate 2. A right oblique detection optical system 170c includes an objective lens 102c, a polarizer 104c, an imaging lens 105c, and a detector 106c. The right oblique detection optical system 170c detects reflected light by forming on the detector 106c an image of the reflected light collected by the objective lens 102c after being generated from the inspection object substrate 2.

The vertical detection optical system 170a includes the objective pupil optical unit 103 and guides the vertical illumination light to the inspection object substrate 2. The vertical detection optical system 170a further includes a mirror 108 that can be inserted into and removed from the optical path, and a two-dimensional detector 109 at a conjugate position with the detector 106a. The two-dimensional detector 109 can detect a two-dimensional image of substantially the same image plane as the detector 106a. The mirror 108 is a half mirror or a total reflection mirror. When the half mirror is used, signals from the detector 106a and the two-dimensional detector 109 can be detected simultaneously.

The detectors 106a, 106b, and 106c are held by stages 107a, 107b, and 107c, respectively. The detectors 106a, 106b, and 106c are one-dimensional detectors such as a CCD linear image sensor and a CMOS linear image sensor. The stages 107a, 107b, and 107c each include an X, Y, and Z translation mechanism and a biaxial rotation mechanism and adjust the position and orientation (an azimuth angle and a tilt angle) of the detectors. The adjustment is performed so that an azimuth in a longitudinal direction and an image plane of an image of an illumination region $R_I$ described below formed by each detection optical system coincide with an azimuth in a longitudinal direction and a light receiving surface of the detectors 106a, 106b, 106c. The azimuth angle is a rotation angle in a plane perpendicular to the optical axis of each detection optical system and the tilt angle is an inclination angle with respect to a plane perpendicular to the optical axis.

FIG. 4 is a perspective view showing a positional relationship between an incidence direction of oblique illumination on an inspection object substrate and detection directions of a plurality of detection optical systems. FIG. 4 shows the relationship between the irradiation direction of the oblique illumination light on the inspection object substrate 2 and detection directions (detection aperture position) of the detection optical systems. The incidence direction of the oblique illumination light output by the oblique illumination optical system 112 to the inspection object substrate 2 is $L_I$, and the reflection direction via the inspection object substrate 2 is $L_R$. An illumination region on the inspection object substrate 2 irradiated with oblique illumination light or vertical illumination light is $R_I$. The vertical detection optical system 170a is represented as an aperture (a range of directions of reflected light collected by the objective lens 102a among the reflected light from the inspection object substrate 2) 102A, the left oblique detection optical system 170b is represented as an aperture 102B, and the right oblique detection optical system 170c is represented as an aperture 102C.

When an XYZ coordinate system is set such that $L_I$ and $L_R$ exist in a YZ plane, the center of the aperture 102A is in a Z axis direction. At this time, the apertures 102B and 102C are arranged in directions in which the centers exist in an XZ plane and are inclined by $\theta_D$ from the Z axis. The oblique illumination optical system 112 and the TTL vertical illumination optical system 111 form a linear illumination beam (the illumination region $R_I$) parallel to a Y axis on the inspection object substrate 2. With the above arrangement, specular reflected light ($L_R$) of the oblique illumination light is not incident on the detection optical systems (170a, 170b, and 170c). Since optical axes of the detection optical systems (170a, 170b, and 170c) are orthogonal to the longitudinal direction of the illumination region $R_I$, images can be focused over the entire illumination region $R_I$. Since the detection optical systems (170a, 170b, 170c) do not detect specular reflected light but detect only diffracted light and scattered light, a flat region on the inspection object substrate 2 is in a dark state, and only an uneven shape (a circuit pattern, a foreign matter, etc.) that emits the diffracted light or the scattered light is detected. Accordingly, highly sensitive defect inspection is possible. Further, since images are focused over the entire illumination region $R_I$, a clear image without blur can be obtained over the entire illumination region $R_I$, so that high speed and highly sensitive defect inspection is possible.

Detection resolution of the detection optical systems depends on a Numerical Aperture (NA) and detection wavelength ($\lambda$) of the detection optical systems. The detection resolution is 1.22 $\lambda$/NA on an Airy disk diameter standard and a point having no spatial spread on an object is detected as a point image having a spread of about the detection resolution. High resolution can be implemented with a short wavelength and a high numerical aperture. When an objective lens having a numerical aperture of about 0.4 at the deep ultraviolet wavelength is used, resolution of about 0.8 μm is obtained.

An AF illumination beam emitted from an Autofocus (AF) illumination system 181 is reflected by the inspection object substrate 2 through an optical path $L_{AI}$ and is received by an AF light receiving system 182 through an optical path $L_{AR}$. The AF illumination system 181 includes a light source and a projection lens and projects a slit shaped image on the inspection object substrate 2. The AF light receiving system 182 includes a light receiving lens and a position sensitive detector (PSD) and measures a position of the slit image. A vertical movement of the inspection object substrate 2 is measured by measuring displacement of the slit image due to the vertical movement of the inspection object substrate 2. A measurement signal is input to the overall control unit 301 and the stage driving unit 151 and is used to adjust the illumination optical system and the detection optical systems of the defect inspection apparatus 1000 and adjust the height (Z) of the inspection object substrate 2 by the stage 152.

Instead of AF illumination system 181 and AF light receiving system 182, an AF illumination and light receiving system including a light source, a projection lens, a light receiving lens, and a position sensitive detector may be arranged at the position of the AF illumination system 181, and a reflection mirror may be arranged at the position of the AF light receiving system 182. An AF illumination beam emitted by the AF illumination and light receiving system is reflected by the reflection mirror and is re-received by the AF illumination and receiving system, so that fluctuations of the slit image during reciprocation is measured. By doing so, the height of the inspection object substrate 2 can be measured with higher accuracy.

In the case of the illumination optical system and the detection optical systems, when an uneven pattern does not exist in the illumination region $R_I$, it is not possible to detect a signal by the illumination light in the detection optical system and adjustment of the illumination optical system and the detection optical systems cannot be performed based on the signal. On the other hand, when a sample having an uneven pattern is arranged at substantially the same position as the inspection object substrate 2 and a detection signal thereof is measured, diffracted light and scattered light generated from the illumination region $R_I$ can be detected by the detection optical systems and the illumination optical system and the detection optical systems can be adjusted. Such a structure having the uneven pattern is the pattern chip 191.

FIG. 5 is a plan view showing a configuration example of a pattern chip used in the first embodiment. FIG. 5 shows a configuration example of the pattern chip 191. By adjusting the illumination optical system and the detection optical systems using the uneven pattern of the pattern chip 191, the illumination optical system and the detection optical systems can be adjusted under the same condition regardless of the pattern of the inspection object substrate 2 and the optical system can be kept in a stable state for a long period of time.

In order to adjust the optical system under conditions similar to those of the inspection object substrate 2, it is desirable that the pattern chip 191 is installed in the vicinity of the inspection object substrate 2 so that the height of a surface thereof is substantially equal to that of the inspection object substrate 2. When surface heights of the inspection object substrate 2 and the pattern chip 191 are different, the height Z of the stage 152 is amended using a difference in height of the surfaces, so that the height of a detection object pattern at the time of the adjustment using the pattern chip 191 and the height at the time of the inspection of the inspection object substrate 2 are substantially equalized.

The pattern chip 191 has an uneven pattern that generates diffracted light or scattered light in a pattern region 601 on the surface. In FIG. 5, a longitudinal direction of the linearly shaped illumination region $R_f$ is a Y direction, and a width direction (a direction orthogonal to the longitudinal direction) of the illumination region $R_f$ is an X direction. The pattern region 601 includes a plurality of pattern sub-regions 602a, 602b, 602c, and the like arranged in the Y direction.

Region sizes of the pattern sub-regions 602a, 602b, 602c, and the like and patterns formed therein are common to each other. Hereinafter, the pattern sub-regions 602a, 602b, 602c, and the like are collectively referred to as "pattern sub-region 602". The length of each region of the pattern sub-region 602 in the Y direction is shorter than a length of the illumination region $R_f$ in the Y direction (for example, ¼ or less). Therefore, a plurality of pattern sub-regions 602 are included in the range of the illumination region $R_f$ in the Y direction. For example, four or more pattern sub-regions 602 are included in the illumination region $R_f$. Accordingly, adjustment of the illumination optical system and the detection optical systems, which will be described below, can be performed using a common geometric pattern at a plurality of locations (four or more locations) in the Y direction of the illumination region $R_f$. Therefore, variations in the adjustment state due to the position of the illumination region $R_f$ in the Y direction (that is, the position in a detection visual field) can be prevented and variations in sensitivity can be prevented.

The pattern sub-region 602 has a plurality of geometric patterns and includes a dot line pattern region 611, a line and space pattern region 612, and a dot L&S pattern region 613.

In FIGS. 4 and 5, although the illumination region $R_f$ is represented by an ellipse for convenience, in reality, intensity distribution of the illumination light is an elliptical Gaussian distribution that is long in the Y direction, and a region where relative intensity with respect to the distribution center is $1/e^2$ or more corresponds to the illumination region $R_f$. The width of the illumination region $R_f$ is a collection width of the Gaussian distribution collected in the X direction. By using thin linear illumination light having a narrow illumination region $R_f$, detection resolution and illumination power density in the X direction can be increased, and a highly sensitive defect inspection can be implemented. The width of the illumination region $R_f$ in the X direction is 0.5 μm to 1.5 μm. Although it is advantageous that the sensitivity increases as the width decreases, it is necessary to increase an aperture angle for collecting illumination light and the depth of focus is narrowed. Accordingly, it is difficult to maintain the stability of the inspection. Practically, about 0.8 μm is appropriate.

FIG. 6 is a plan view showing a configuration example of a dot line pattern region used in the first embodiment. FIG. 6 shows a configuration example of the dot line pattern region 611. The dot line pattern region 611 is a line in which dot patterns are arranged in a single line at a predetermined interval in the X direction. Black spots correspond to individual dots 1903. An interval dx in the X direction of the dots 1903 in the dot line pattern region 611 is smaller than the width of the illumination region $R_f$ and a pixel size in the X direction of the detectors 106a, 106b, and 106c. Therefore, regardless of a relative position of the illumination region $R_f$ in the X direction with respect to the dot line, a signal of any one of the dots is detected, and a detection position of the dot line in the Y direction is measured by the detectors 106a, 106b, and 106c.

FIG. 7 is a diagram showing a color map of a scattered light distribution calculation result by dots of the pattern chip used in the first embodiment and an aperture position of the detection optical system. Since the scattered light of the dot patterns of the dot pattern region 611 appears almost uniformly in all directions as shown in FIG. 7, the scattered light can be detected by all of the detection optical systems (170a, 170b, 170c). In the detectors 106a, 106b, and 106c, the interval in the Y direction of the signals of the dot line pattern region 611 arranged in the Y direction is proportional to magnification of each detection optical system. Therefore, the magnification of each detection optical system can be adjusted to a desired value based on the interval of the detected dot line pattern region 611 in the Y direction.

Positions of the detectors 106a, 106b, 106c (Y direction positions of a detection object region on the pattern chip 191) in a Yp direction can be aligned by measuring the positions in the Y direction of the signal of the dot line pattern region 611 in the detectors 106a, 106b, 106c and aligning the positions between the plurality of detectors. Accordingly, signals detected by the detectors 106a, 106b, and 106c on the same location of the inspection object substrate 2 can be compared and integrated and inspection sensitivity can be improved.

FIG. 8 is a plan view showing a configuration example of a dot L&S pattern region used in the first embodiment. FIG. 8 shows a configuration example of the dot L&S pattern region 613. Black spots in the drawing correspond to the individual dots 1903. The dot L&S pattern region 613 has a configuration in which a minimum repeating unit region 1902 is repeatedly arranged in two dimensions (the X direction and the Y direction). The minimum repeating unit region 1902 is a region elongated in the Y direction. A plurality of dots in the region are linearly arranged to be mirror-image symmetric with respect to the center position in the Y direction. In FIG. 8, the minimum repeating unit region 1902 is arranged only in the X direction for convenience of the drawing. In this way, the minimum repeating unit region 1902 serves as a basic repeating unit.

Here, a minimum interval in the X direction of the dots 1903 in the minimum repeating unit region 1902 is dx and an interval in the Y direction is dy. As shown in FIG. 8, dx corresponds to the minimum interval in the X direction of the plurality of dots corresponding to each row arranged in the Y direction. Further, the length of the minimum repeating unit region 1902 in the X direction is lx and the length in the Y direction is ly.

The size of the dot L&S pattern region 613 is M×N times the minimum repeating unit region 1902. M is the number of dots in the X direction and N is the number of dots in the Y direction. Typically, M is about 2000 to 10000 and N is about 5 to 50. An example of a suitable parameter is dx=0.1 μm, dy=2 μm, (M, N)=(5000, 10), the size of the minimum repeating unit region 1902 is lx×ly=1 μm×40 μm (X direction×Y direction), and the size of the dot L&S pattern region 613 is 5 mm×400 μm.

As the repetition number M in the X direction increases, the dot L&S pattern region 613 increases in the X direction, and fine adjustment of the position of the illumination region $R_f$ in the X direction is not necessary. In particular, when the pattern chip 191 is irradiated with the illumination light in an ultraviolet region having a short wavelength, the pattern formed on the pattern chip 191 is damaged by irradiation of the illumination light and deteriorates. The deterioration changes the intensity and distribution of scattered light generated from the pattern, and consequently changes the adjustment state of the optical system adjustment using the pattern chip 191. In this manner, the irradiation with the illumination light in the ultraviolet region may impair the stability of the inspection performance.

In contrast, in the present embodiment, the dot L&S pattern region 613 is long in the X direction, and a large number of the same patterns (that is, the minimum repeating unit region 1902) exist in the X direction. Therefore, in the case of the pattern chip 191 according to the present embodiment, the same adjustment operation as that before deviation can be performed simply by deviating an installation position of the pattern chip 191 in the X direction with respect to the linear illumination region $R_I$. Therefore, by periodically deviating the installation position of the pattern chip 191 in the X direction, it is possible to avoid damages due to long-time irradiation of the illumination light in the ultraviolet region. Alternatively, it is possible to perform stable adjustment for a long period of time by using another region that does not deteriorate instead of using a deteriorated region on the pattern chip 191.

The width lx of the minimum repeating unit region 1902 in the X direction is larger than the width of the illumination region $R_I$ in the X direction (for example, 0.8 μm). In addition, only one dot 1903 exists in the same Y coordinate within the minimum repeating unit region 1902. Under these conditions, when the dot L&S pattern region 613 is detected by a linear image sensor (the detectors 106a, 106b, 106c) that is long in the Y direction, it is possible to avoid detection of overlapping signals of a plurality of dots.

The individual dots 1903 are, for example, substantially circular concave or convex patterns patterned on a silicon substrate by a method such as focused ion beam processing, electron beam processing, laser processing, or photolithography, or a substantially circular opaque pattern formed on a transparent substrate such as synthetic quartz.

The scattered light is generated from the dots 1903 by the illumination light by the oblique illumination optical system and is detected by the detection optical systems. A diameter of the circular pattern may be within a range of about 0.05 μm to 0.3 μm, for example, about 0.1 μm is desirable. Since the circular pattern having a diameter of 0.1 μm has sufficiently small detection resolution, the circular pattern is detected as an image similar to a point pattern having substantially no length.

When a processing apparatus used to process the pattern does not correspond to the processing of the circular pattern, a regular square, a regular hexagon, or a shape close to a circle by combining a small triangle and a square having the same dimension as the circular pattern may substitute for the circular shape. When a difference between the above substitute shapes and the ideal circular pattern is smaller than the wavelength of the illumination light, spatial resolution during detection, or processing resolution of the processing apparatus, the substitute shape patterns function similarly to the circular pattern. From a viewpoint of increasing the intensity of the scattered light by the left and right oblique detection optical systems 170b and 170c, a hexagonal pattern or a triangular pattern having an edge in an oblique direction to the incidence direction of illumination is preferable as a substitute shape. For example, an edge in a direction inclined with respect to the incidence direction $L_I$ (+Y axis direction in the XY plane) of the illumination light (for example, a direction inclined by 45° with respect to the Y axis direction) has an effect of directing the scattered light in the ±X direction. Accordingly, it is effective to increase the detection intensity by the oblique detection optical system.

The description will now return to FIG. 7. FIG. 7 shows angular distribution of the scattered light by the dot pattern as described above. A large circle in FIG. 7 is obtained by arranging the illumination direction and the aperture positions of the detection optical systems shown in FIG. 4 on a celestial sphere centered on the origin of the XYZ axis in FIG. 4 and then projecting a hemisphere in which Z is 0 or more onto the XY plane. A front end of a vector $L_R$ indicating a specular reflected direction of the oblique illumination light and the positions of the apertures 102A, 102B, and 102C of the detection optical systems are shown. FIG. 7 shows an angular distribution (a calculation value by simulation) of scattered light intensity of a cylindrical concave dot pattern having a diameter of 0.1 μm and a depth of 0.1 μm. The illumination is oblique illumination with a wavelength of 266 nm as well as S and P polarization.

In order to perform the adjustment by detecting the scattered light of the dot pattern by each detection optical system, it is desirable that the apertures 102A, 102B, and 102C of the detection optical systems are distributed over a wide range so that sufficient detection signal intensity can be obtained. In order to detect and measure a defocus of the detection optical systems with high accuracy, it is desirable that the distribution of the scattered light uniformly spreads in the apertures 102A, 102B, and 102C of the individual detection optical systems compared with a case where the distribution of the scattered light is locally biased in the apertures 102A, 102B, and 102C. The distribution of the scattered light shown in FIG. 7 satisfies the above conditions. The distribution of the scattered light of the dot pattern is distributed substantially uniformly on the celestial sphere because the size of the dot pattern has a short wavelength and the scattering can be approximated by Rayleigh scattering.

As for the polarization of the illumination light, P-polarized light has a greater scattered light intensity than S-polarized light. Therefore, it is desirable to use the P-polarized light when the adjustment is performed by irradiating the dot pattern with oblique illumination light. When considering the same cylindrical convex pattern, it is known that, although the P-polarized light illumination has a greater scattered intensity than the S-polarized light, the scattered light intensity is biased around the specular reflection ($L_R$). On the other hand, in the case of the concave pattern, in the P-polarized light illumination having a large scattered light intensity, the scattered light spreads uniformly around the position of the aperture 102A as shown in FIG. 7. Therefore, the concave pattern is more preferable as compared with the convex pattern.

FIG. 9 is a diagram showing a waveform of a detection signal obtained from the dot L&S pattern region of the pattern chip according to the first embodiment. FIG. 9 shows an example of a waveform of a detection signal obtained when the dot L&S pattern region 613 is irradiated with vertical illumination light or oblique illumination light and detected by the detection optical system (170a, 170b, or 170c). In FIG. 8, a situation in which the center position in the width direction (the X direction) of the illumination region $R_I$ is in the vicinity of X=5dx (an adjustment state 1 in FIG. 9) is considered. As described above, when the width of the illumination region $R_I$ in the X direction is 0.8 μm, dx=0.1 μm, dy=2 μm, and y=40 μm, since the detected dot pattern signal is proportional to the illumination intensity at the dot position, the signal intensity of the dots 1903 at Y=5dy and 15dy close to the center of the illumination region $R_I$ is largest. When the center of the illumination region $R_I$ is located at X=4dx (an adjustment state 2 in FIG. 9), the dots 1903 at Y=4dy and 16dy are close to the center of the $R_I$, and the dot signal intensity thereof is largest.

Conversely, the signal at a location having the largest signal corresponds to the signal of the dot 1903 closest to the center in the X direction of the illumination region $R_I$.

In the present embodiment, since the interval dx between the dots in the X direction is 0.1 μm, which is sufficiently smaller than the width in the X direction of the illumination region $R_I$, almost the same signal intensity (a maximum value) can be measured for all dots located at the center of the illumination region $R_I$.

Further, in the present embodiment, since the interval dy between the dots in the Y direction is 1 μm and the interval d between closest dots is 2.005 μm, both of which are larger than the spatial resolution (depending on the wavelength and the numerical aperture of the detection optical systems, for example, 0.7 μm to 0.9 μm at the wavelength of 266 nm) of the detection optical systems, detection signals of neighboring dots do not overlap with each other and the detection intensity of each dot can be measured with high accuracy as shown in FIG. 9.

As mentioned above, although ideally the detection signals of the neighboring dots do not overlap, since a tail of a point spread function of the detection optical system is applied to adjacent dots, the arrangement of the adjacent dots may affect a detection signal of each dot. In addition, in the intermediate stage of the actual adjustment, the spatial resolution of the detection optical system is low in a defocused state, and accordingly the scattered light of a nearby dot may interfere with and influence the scattered light of a certain dot. Since the influence of the interference depends on the arrangement of the dots, when the arrangement of the dots is left-right asymmetric, the adjustment state may differ between the left oblique detection optical system 170b and the right oblique detection optical system 170c.

By the way, in the minimum repeating unit region 1902 according to the present embodiment, dot patterns of the 0 to 10dy region and dot patterns of the 10dy to 20dy region are in a mirror image symmetrical arrangement in the Y direction. Therefore, even when the influence of the interference between the neighboring dots occurs, the influence of the left-right asymmetry is canceled and a difference in the adjustment state between the left oblique detection optical system 170b and the right oblique detection optical system 170c can be avoided.

In the case of FIG. 9, the adjustment state 1 is a state in which the center of the illumination region $R_I$ is X=5dx and the detection optical system is in focus; on the other hand, the adjustment state 2 is a state in which the center of the illumination region $R_I$ is X=4dx and the detection optical system is not in focus. By focusing the detection optical system, the waveform of the dot detection signal becomes sharp and peak intensity increases. This can be determined from a fact that the maximum intensity of the dot detection signal (locations indicated by a circle in FIG. 9) in the adjustment state 1>the maximum intensity of the dot detection signal in the adjustment state 2.

When the interval dx in the X direction of the dot arrangement is equal to or greater than the width of the illumination region $R_I$, or when using an isolated dot signal as an adjustment standard, it is difficult to determine whether an increase and decrease in dot peak intensity is due to defocusing of the detection optical system or due to a change in a relative position of the dot in the X direction relative to the illumination region $R_I$, and it is difficult to adjust the focus of the detection optical system with high accuracy.

In contrast, in the dot L&S pattern region 613 according to the present embodiment, since the interval dx in the X direction is a sufficiently small dot pattern arrangement, the detection optical system can be adjusted with high accuracy without being affected by the position fluctuation of the illumination region $R_I$.

In each dot detection signal, there is a case in which the peak intensity fluctuates due to noise of a sensor and slight fluctuation in an imaging state of the detection optical system and the dot detection signal may not be stable. However, in the dot L&S pattern region 613, since there are 2M dots closest to the center position of the illumination region $R_I$, for example, by using an average value of the dot signal intensity at upper M' (M' is 2 or more and 2M or less) positions as an evaluation value, even when the peak intensity of each dot signal fluctuates, the influence can be reduced and a stable adjustment result can be obtained.

Although not shown, the L&S pattern region 612 includes a plurality of line patterns that are long in the X direction and are arranged at a predetermined pitch in the Y direction. That is, when irradiating a line pattern in the X direction, which is a direction orthogonal to the incidence direction of the illumination light by the illumination optical system, with the oblique illumination light or the vertical illumination light, strong diffracted light and scattered light are generated in the direction in the XZ plane from an edge portion of the line pattern. Since the signal of the L&S pattern region 612 is strongly detected by the vertical detection optical system 170a, it is used for adjustment of the vertical detection optical system 170a and adjustment of the oblique illumination optical system 112 and the TTL illumination optical system 111 based on the signals detected by the vertical detection optical system 170a.

Meanwhile, the signal of the L&S pattern region 612 is weak in the oblique detection optical system (170b, 170c). Therefore, the adjustment of the oblique detection optical system (170b, 170c) is performed using the signals of the dot line pattern region 611 and the dot L&S pattern region 613.

FIG. 10 is a plan view and cross-sectional view showing a step of the L&S pattern region used in the first embodiment. Each of the dot line pattern region 611, the dot L&S pattern region 613, and the L&S pattern region 612 has an adjacent stepped region whose height in the normal direction of the surface of the stage 152 is different from each other in each region. FIG. 10 shows an example of a step shape of the L&S pattern region 612. By forming an arrangement region having a common pattern in each of a plurality of regions having different surface heights, pattern signals corresponding to a plurality of stage heights can be obtained without repeatedly executing the measurement of the pattern signal by physically moving the stage 152, so that an optimum focus position can be measured in a short time.

A step amount per step is set equal to or less than a depth of focus of the illumination optical system and the detection optical system. By providing a three-stage stepped region as shown in FIG. 10, the number of times of Z movement and image capture of the stage 152 for searching for the optimum focus position is reduced to ⅓ times as compared with the case where the stepped region is not provided.

FIG. 11 is a flowchart showing an overall adjustment procedure of the optical system using the pattern chip according to the first embodiment. FIG. 11 shows the overall adjustment procedure of the illumination optical system and the detection optical system using the pattern chip 191. Although the adjustment procedure of the oblique illumination optical system and the detection optical system is shown as an example, a combination of the vertical illumination optical system and the detection optical system can be adjusted by the same procedure. Steps of FIG. 11 describe contents of adjustment executed at each stage, a pattern region used when performing measurement, and a detection optical system for obtaining a detection signal. The procedure will be described below in order. A series of processing is executed by the overall control unit 301.

First, the overall control unit 301 moves the pattern chip 191 by the stage 152 and installs it in the illumination region $R_I$ of the illumination optical system (that is, an inspection object position by the detection optical system) (step S100). Next, the overall control unit 301 adjusts a focus of the vertical detection optical system 170a using a signal obtained by detecting the L&S pattern region 612 with the vertical detection optical system 170a (step S101). Next, the overall control unit 301 adjusts an X direction position of the illumination region $R_I$ by the oblique illumination optical system 112 using the signal obtained by detecting the L&S pattern region 612 with the vertical detection optical system 170a (step S102). Subsequently, the overall control unit 301 adjusts a focus of the illumination light by the oblique illumination optical system 112 using the signal obtained by detecting the L&S pattern region 612 with the vertical detection optical system 170a (step S103).

Further, the overall control unit 301 adjusts X direction positions of the detectors (106a, 106b, 106c) of the vertical detection optical system 170a and the oblique detection optical systems (170b, 170c) using signals obtained by detecting the dot L&S pattern region 613 with the vertical detection optical system 170a and the oblique detection optical systems (170b, 170c) (step S104). Next, the overall control unit 301 adjusts a focus of the vertical detection optical system 170a and the oblique detection optical systems (170b, 170c) (that is, the Z direction position of the detectors (106a, 106b, 106c)) using signals obtained by detecting the dot L&S pattern region 613 with the vertical detection optical system 170a and the oblique detection optical systems (170b, 170c) (step S105). Next, the overall control unit 301 adjusts an optical magnification of the detection optical systems (170a, 170b, 170c) using signals obtained by detecting the dot line pattern region 611 with the detection optical systems (170a, 170b, 170c) (step S106). Subsequently, the overall control unit 301 adjusts a Y direction position of the detectors (106a, 106b, 106c) of the detection optical systems (170a, 170b, 170c) using signals obtained by detecting the dot line pattern region 611 with the vertical detection optical system 170a and the oblique detection optical system (170b, 170c) (step S107).

Thereafter, the overall control unit 301 measures and adjusts power of the illumination light using the signal obtained by detecting the L&S pattern region 612 with the vertical detection optical system 170a (step S108). Next, the overall control unit 301 performs fine adjustment of the height Z of the stage 152 using the signal obtained by detecting the dot L&S pattern region 613 with the detection optical systems (170a, 170b, 170c) (step S109). Thereafter, the overall control unit 301 moves the inspection object substrate 2 to the illumination region $R_I$ (step S110).

That is, the overall adjustment procedure is processing of adjusting a three-dimensional position of each detector relative to a focal position of each of the vertical detection optical system and the oblique detection optical system and the illumination region of the illumination light by using the signals of the scattered light obtained in each of the vertical detection optical system and the oblique detection optical system.

In order to adjust the position and the focus of the illumination light, it is necessary to focus the detection optical system. Therefore, as described above, the overall control unit 301 first performs focus adjustment (step S101) of the detection optical system. In the oblique detection optical system, the optical axis is inclined with respect to the pattern chip 191 and the focus is performed only at a specific X direction position. Therefore, the overall control unit 301 adjusts the focus of the vertical detection optical system to measure the state of the illumination light. Although the vertical detection optical system can detect pattern signals of both L&S pattern region 612 and the dot L&S pattern region 613, when the L&S pattern region 612 is used, there is an advantage that signal processing for extracting dots located near the center of the illumination region $R_I$ as described in FIG. 9 is unnecessary.

The overall control unit 301 adjusts the Z position of the pattern chip 191 so that the two-dimensional detector 109 is fixed to a design image plane position by the objective lens 102a and the imaging lens 105a and that the intensity variation in the Y direction corresponding to the edge of the line pattern becomes clearer than the detection signal of the L&S pattern region 612 by the two-dimensional detector 109. By doing so, the focus of the vertical detection optical system 170a is adjusted.

The Z position of the two-dimensional detector 109 and the Z position of the detector 106a that is in conjunction therewith may be adjusted. By the implementation of step S101, the Z position of the pattern chip 191 is fixed to a position where the vertical detection optical system 170a is in focus.

In step S102, the overall control unit 301 adjusts the X position of the illumination region $R_I$ by adjusting the optical axis by the mirror unit 1101 to match the position where the signal of the detector 106a is maximum. In step S103, the overall control unit 301 adjusts the focus by moving the oblique illumination optical system 112 in the optical axis direction by a stage 1103, so that the width of the illumination region $R_I$ measured by the two-dimensional detector 109 is equal to or less than a predetermined value.

In step S109, the overall control unit 301 scans the surface height of the pattern chip 191 by the stage 152 and acquires a signal of the dot L&S pattern region 613 by the detection optical systems (170a, 170b, 170c). The overall control unit 301 obtains a Z height of the stage 152 at which the signal is maximized in each detector and sets the average value thereof as a standard value of the stage height. The overall control unit 301 records the standard value of the stage height as a height measurement value by the AF illumination system 181 and the AF light receiving system 182 or a height Z setting value of the stage 152.

With steps S100 to S110 described above, the illumination region $R_I$ of the illumination optical system matches the detection visual field of the detection optical system (the X direction positions of the detectors 106a, 106b, and 106c), and the detection optical systems in the illumination region $R_I$ are in focus.

In this state, adjustment parameters such as the height measurement value of the inspection object substrate 2 by the AF illumination system 181 and the AF light receiving system 182, the height Z setting value of the stage 152, setting values of the oblique illumination optical system adjustment mechanism (the mirror unit 1101, the stage 1103), position setting values of the detectors 106a, 106b, 106c, and an adjustment completion time and environmental conditions at that time (temperature, pressure, etc. of the intra-apparatus space 2001) are recorded, input and stored in the overall control unit 301.

FIG. 12 is a flowchart showing a partial adjustment procedure of the optical system using the pattern chip according to the first embodiment. FIG. 12 shows an example of the partial adjustment procedure of the illumination optical system and the detection optical system using the pattern chip 191. The partial adjustment procedure is constituted by a procedure in which a part of the adjustment procedure included in the overall adjustment procedure shown in FIG. 11 is extracted, or a simplified procedure thereof.

After the overall adjustment, the optical axis and the focus position of the detection optical systems (170a, 170b, 170c), the AF illumination system 181, the AF light receiving system 182, and the Z height of the stage 152 are gradually deviated (drift) due to expansion and contraction of mechanical components caused by minute temperature fluctuations and atmospheric pressure fluctuations, refractive index fluctuations of the medium, and the like over time. Since the amount of deviation affects the detection sensitivity, it is effective to amend the deviation by re-adjustment at a high frequency in order to keep the inspection sensitivity stable.

In the partial adjustment procedure shown in FIG. 12, the overall control unit 301 performs the detection optical system magnification adjustment using the dot line pattern region 611 (step S106), the detection optical system detector position adjustment (Y) using the dot line pattern region 611 (step S107), and the stage height fine adjustment using the dot L&S pattern region 613 (step S109). Adjustment items included in the partial adjustment procedure are sensitive to minute amounts of deviation and items requiring adjustment at a high frequency are selected. Since the number of adjustment items is smaller than the number of the overall adjustment procedure, the adjustment can be completed in a short time. By performing the partial adjustment procedure at a high frequency with respect to the overall adjustment procedure, it is possible to reduce total adjustment time while amending the deviation caused by the drift of the optical system in the apparatus and keeping the inspection sensitivity stable.

That is, the partial adjustment procedure is processing of adjusting the focal point by changing the position of the detector of the vertical detection optical system or the oblique detection optical system in the optical axis direction and the position of the stage in the height direction using the scattered light signal.

FIG. 13 is a flowchart showing an inspection procedure including adjustment of the optical system by the defect inspection apparatus according to the first embodiment. FIG. 13 shows an example of an inspection procedure executed in the defect inspection apparatus 1000. The processing is executed each time the signal processing unit 200 and the overall control unit 301 perform inspection. First, an inspection object (the inspection object substrate 2) is inserted into the apparatus and installed on the stage 152 (step S702). Next, an inspection condition is set (step S703). The inspection condition includes an illumination condition (for example, an illumination angle: oblique/vertical/both oblique and vertical) and a detection condition (whether to use a vertical detection optical system, a left oblique detection optical system, and a right oblique detection system, separately). Next, adjustment and setting of the illumination optical system and the detection optical system are performed (steps S704 to S707, and S710).

The object of the adjustment and setting is the illumination optical system and the detection optical system selected to be used in step S703. First, time elapsed since the previous adjustment of the object optical system is obtained, and it is determined whether or not the time exceeds a predetermined period of time during which the state can be maintained after the adjustment is completed (step S704). When the time exceeds the predetermined time, the processing moves to step S710. When the time does not exceed the predetermined time, it is determined whether or not the change in the environmental condition after the previous adjustment (a temperature change, an atmospheric pressure change, etc. of the intra-apparatus space 2001) exceeds a predetermined threshold value (step S705). When the change exceeds the threshold value, the processing moves to step S710. When the change does not exceed the threshold value, a partial adjustment (step S706) using the pattern chip shown in FIG. 8 is executed. Next, the illumination optical system and the detection optical system are set based on adjustment parameters stored at the time of the previous adjustment (step S707). Thereafter, the inspection is executed (step S708), the inspection result is stored and displayed (step S709), and the inspection is ended (step S720).

When one of the determinations in steps S704 and S705 is Yes, the overall adjustment of the optical system using the pattern chip shown in FIG. 10 is performed and the adjustment parameters are updated. When both of the steps S704 and S705 are No, the optical system is set using the adjustment parameters obtained by the adjustment using the pattern chip 191 in the previous inspection.

According to the above method, when there is a possibility that the original inspection performance may not be obtained due to the deviation of the adjustment state due to the lapse of time or the change in the environmental condition, the adjustment using the pattern chip 191 can be performed and the inspection can be performed in a sufficiently adjusted state. When it is expected that the deviation in the adjustment state from the previous adjustment is small enough and no problem would occur, the overall adjustment using the pattern chip 191 is omitted and only the partial adjustment is made. Accordingly, it is possible to avoid spending time on adjustment more than necessary and increase the inspection throughput.

(2) Second Embodiment

FIG. 14 is a plan view showing a configuration example of a dot L&S pattern region used in a second embodiment. FIG. 14 shows another configuration example of the dot L&S pattern region 613. Black spots in the figure correspond to the individual dots 1903. The dot L&S pattern region 613 is a pattern arrangement in which dots are arranged at equal intervals in a straight line in the X direction and arranged at equal intervals in the Y direction.

An interval dx in the X direction of the dots 1903 in the dot L&S pattern region 613 is the same as that of the dot line pattern region 611, and is smaller than the width of the illumination region $R_I$ and the resolution of the detection optical systems 170a, 170b, 170c. Therefore, a signal of any dot is detected for each row at the same Y position regardless of a relative position in the X direction of the illumination region $R_I$ with respect to the dot line. In the detectors 106a, 106b, 106c, signals of the dot L&S pattern are detected as equally spaced bright spots arranged in the Y direction.

Although it is possible to detect the dot signal regardless of the relative position in the X direction of the illumination region $R_I$ with respect to the dots by setting the above interval dx, strength of the signal intensity depends on a distance between the center of $R_I$ and a nearest dot. As shown in FIG. 14, by deviating the position of the dot in the X direction for each row aligned in the Y direction by a distance (in the example in FIG. 14, half the dot interval dx)

that is narrower than the distance dx of the dot in the X direction, and extracting a dot signal having a strong signal intensity from the obtained signal, variations in the strength of the signal intensity are prevented and adjustment with high accuracy is possible.

Since the pattern chip 191 is irradiated with ultraviolet illumination light each time the adjustment of the optical system is performed, a surface state is changed due to damage or deterioration of a surface when the intensity of the illumination light is strong. Accordingly, stable adjustment may be hindered. As compared with the vertical detection optical system, the oblique detection optical system is weaker in detection signal intensity because it is far from a regular reflection direction of the illumination light by a substrate and far from the normal direction of the substrate. The necessary illumination light intensity is determined on the condition that signal intensity sufficient for detection can be obtained in the oblique detection optical system. Therefore, it is effective to prevent damages by increasing the signal intensity detected by the oblique detection optical system.

In order to maximize the detection signal of the dot line pattern region 611 and the dot L&S pattern region 613 by the oblique detection optical system, the interval dx in the X direction of the dots is designed such that an emission position of diffracted light by the dots is near the center of the apertures 102B and 102C of the oblique detection optical system. A relationship between a pattern of the diffracted light by the dot line pattern and the aperture 102B of the left oblique detection optical system is shown in FIG. 15.

FIG. 15 is a schematic view showing a relationship between diffracted light distribution by the dot L&S pattern region used in the second embodiment and an aperture position of the detection optical system. In FIG. 15, a scattering and diffraction direction shown in FIG. 4 is projected on a plane. The aperture position of the detection optical system or a traveling direction of the light beam corresponds to a region or a point on a celestial sphere with a radius of 1, and is projected onto a plane parallel to the XY plane. The distance from the center of FIG. 15 corresponds to sine ($\sin \theta$) of an angle $\theta$ from a zenith (Z direction). The black and white distribution shows the intensity distribution of the diffracted light by the dot line pattern having the interval dx in the X direction that maximizes the signal.

When an interval between repeating patterns in the X direction is dx, the wavelength is $\lambda$, an incidence angle of illumination in the XZ plane is $\theta i$, and an angle of a first-order diffracted light is $\theta d$, since $\theta i=0$ when an illumination optical axis passes through the YZ plane, a relational expression of $\sin \theta d = \lambda/dx$ is satisfied. dx may be determined such that $\sin \theta d$ is located at the center of the aperture of the oblique detection optical system in FIG. 15. When $\lambda=266$ nm, an inclination angle $\theta D$ of the oblique detection optical system is 45°, and a detection numerical aperture is 0.4, an upper end of the aperture of the oblique detection optical system has $\sin \theta=0.93$ and a lower end has $\sin \theta=0.37$. Therefore, $\sin \theta d=0.65$ may be obtained and dx=0.41 µm. When $\lambda=266$ nm, $\theta D=60°$, and the detection numerical aperture is 0.4, dx=0.34 µm is obtained by the same calculation. With such a design, the detection signals of the dot line pattern region 611 and the dot L&S pattern region 613 are maximized. The above is the second embodiment.

(3) Third Embodiment

In the above measurement of pattern signals, an edge of a dot or a line pattern is detected as a bright spot or a bright line. Depending on whether a peak position of the bright spot or bright line is at the center of a detection pixel of the detectors 106a, 106b, 106c and the two-dimensional detector 109 or between pixels, the peak intensity obtained as a maximum value in a region changes. Generally, intensity variation is reduced by averaging detection signals of a plurality of dots or line edges. However, when a pattern interval is an integral multiple of the detection pixel interval, since relative positions of the plurality of peak signals with respect to the detection pixels coincide with all patterns, an effect of reducing fluctuations by averaging the plurality of peak signals cannot be obtained.

By deviating an interval dy of dots in the Y direction of the pattern from an integer multiple of the interval (a pixel pitch) py of pixels of the detectors 106a, 106b, 106c and the two-dimensional detector 109, it is possible to reduce pattern intensity fluctuation. Specifically, by setting the pattern interval according to $dy=py \times (n \pm 1/m)$ (n is an integer and m is an integer of 2 or more), a relative position of the pattern position with respect to the detection pixel is deviated by 1/m pixel for each line of the pattern arranged in the Y direction. Therefore, by averaging detection signals (the peak intensity) of a plurality of rows, fluctuation in detection intensity depending on the pattern-to-pixel position are averaged and stable adjustment is possible.

When the detection optical systems 170a, 170b, and 170c have a plurality of optical magnifications and the magnifications can be switched by changing the setting, it is effective to set a pattern interval such that the plurality of magnifications satisfy the above conditions. For example, when a pixel interval of the detector is 5 µm and the optical magnification can be switched to two ways including 25 times and 16.7 times, the pixel interval py on an object (on the pattern chip 191) is 0.2 µm and 0.3 µm, respectively. The interval dy of dots in the Y direction of the pattern in which m is the common to these two magnifications is dy=2.04 µm, 2.16 µm, 2.64 µm, and 2.76 µm in the range of m=5 and dy=2 to 3 µm.

In order to maximize the signal fluctuation reduction effect due to averaging, the number of rows in which the patterns are arranged in the Y direction is preferably m or more, and more preferably a multiple of m.

A waveform of the peak signal of the pattern can be obtained at a sampling interval finer than 1/m times a pixel interval py of the detector by using the interval dy of dots in the Y direction of the pattern and performing reconstruction of the signal based on the relationship of the amount of deviation of the pixel interval py of the detector. This method is described below.

FIG. 16 is a diagram showing a waveform of a detection signal obtained by signal reconstruction of a dot L&S pattern region used in the third embodiment. FIG. 16(a) shows an example of a detection signal waveform obtained by dy=2.04 µm and py=0.3 µm (n=7, m=5). The signal waveform includes five peak signals, and each region corresponds to one pattern signal when the signal waveform is divided into five regions (Patterns: 1 to 5 in the figure) for each dot interval dy in the Y direction of the pattern. Since the amount of deviation of the relative position with respect to the detection pixel for each pattern row arranged in the Y direction is py/m=0.6 µm, a positional deviation amount for each region is obtained (deltaY in the figure). When the signal is plotted as a new Y coordinate (new-Y) with a value obtained by deviating an in-region coordinate (Y=0 to 2.04) by deltaY for each region, a signal waveform with an interval of py/m as shown in FIG. 16(b) is obtained. By obtaining the peak signal waveform of a sampling interval finer than the pixel interval of the detector by the above method, it is possible to perform measurement of the point image distribution function of the detection optical system with high accuracy, and it is possible to evaluate the performance of the detection optical system including highly accurate focus adjustment and aberration with high accuracy. This makes it possible to perform highly accurate adjustment and inspection performance management.

(4) Fourth Embodiment

FIG. 17 is a plan view showing a configuration example of a dot L&S pattern region used in a fourth embodiment. FIG. 17 shows a dot arrangement example of the minimum repeating unit region 1902 constituting the dot L&S pattern region 613 of the pattern chip 191 used in the fourth embodiment. The configuration of the pattern chip 191 is the same as that in the first embodiment. The pattern chip 191 in the present embodiment is different from the first embodiment in the configuration of the dot L&S pattern region 613.

A structure of the dots 1903 constituting the minimum repeating unit region 1902 in the present embodiment, an interval dy in the Y direction of the dots 1903, and an interval dx in the X direction are the same as those in the first embodiment. That is, in the range of the minimum repeating unit region 1902, the interval dx in the X direction of the dots 1903 is sufficiently smaller than the width of the illumination region $R_I$ (0.8 µm as an example), and the interval dy in the Y direction and the interval between the closest dots in the Y direction of the dots 1903 are 1 µm or more and are larger than the spatial resolution of the detection optical system (depending on the wavelength and the numerical aperture of the detection optical system, for example, 0.7 to 0.9 µm at a wavelength of 266 nm). Further, the dots 1903 in the minimum repeating unit region 1902 are all different in the Y direction.

After these conditions of dot intervals are satisfied, the dots 1903 are arranged in a random arrangement in the minimum repeating unit region 1902. The "random" here refers to a state having no specific directionality or specific correlation distance.

Since the dot arrangement that satisfies the above conditions does not cause deviation corresponding to a specific directionality or spatial frequency in the scattered light distribution, the adjustment of the left/right oblique detection optical system has an advantage that the difference in adjustment state is not likely to generate. In addition, compared with the dot L&S pattern region 613 in the first embodiment, dx and dy are common. However, since it is not necessary to provide a mirror image symmetric pattern for canceling the influence of the left-right asymmetry, the length ly in the Y direction of the minimum repeating unit region 1902 can be small (about half), and there is an advantage of high space efficiency.

(5) Fifth Embodiment

FIG. 18 is a plan view showing a configuration example of a bent L&S pattern region used in the fifth embodiment. FIG. 18 shows a pattern shape and arrangement example to be substituted for the dot L&S pattern region 613 of the pattern chip 191 used in the fifth embodiment. The configuration of the pattern chip 191 is the same as that in the first embodiment. The pattern chip 191 in the present embodiment is different from the first embodiment in the configuration of the dot L&S pattern region 613.

In the fifth embodiment, in the dot L&S pattern region 613, an L&S pattern in the X direction having an edge with continuous triangular wave bending is used instead of the dot pattern arrangement. Hereinafter, the pattern is referred to as a bent L&S pattern. An oblique edge at which the diffracted light exits in the aperture direction of the oblique detection optical system is arranged in a narrow strip-shaped region extending in the X direction. By doing so, the oblique edge is detected as a line-shaped image in the X direction (as a bright spot in a one-dimensional detector that is long in the Y direction) in the oblique detection optical system similarly to the dot line pattern or the dot L&S pattern. One cycle of the triangular wave repeated in the X direction functions as an alternative of one dot.

The interval dx in the X direction of the bending L&S pattern repeatedly arranged in the X direction is set such that an emission angle of the diffracted light matches an aperture position of the oblique detection, similarly to the dot line pattern or the dot L&S pattern. That is, it is common to an optimum interval dx of the dots. In the case of a dot line pattern, there is a space without a pattern between the dots, that is, a space that does not generate scattered light. In contrast, the pattern aims to increase the detection signal intensity by filling the gap in the X direction with the edge detected by left or right oblique detection. In addition, since the pattern width h in the Y direction can be made shorter than that of the dot pattern, there is an effect that it is more sensitive for minute defocus from an in-focus position.

FIG. 19 is an explanatory diagram of edge angle optimization of the bending L&S pattern used in the fifth embodiment. FIG. 19 shows in the right view a relationship between an emission direction of diffracted light by a linear edge (a left view in FIG. 19) in an angle ψ direction in the XY plane and an aperture position of the oblique detection optical system. The right view in FIG. 19 is the same as FIG. 15. A traveling direction of the scattered light or diffracted light by the edge of the left view in FIG. 19 is distributed on a straight line (a range indicated by a dash-dot line in FIG. 19) whose angle with the Y axis is ψ and which passes through a point corresponding to the traveling direction of specular reflected light in FIG. 19. In the case of low-elevation illumination (an angle $θ_I$ shown in FIG. 4 is 25 degrees or less) and an inclination angle of the oblique detection optical system of θd=60 degrees, ψ=about 43 degrees is obtained by geometric calculation. By setting the inclination angle ψ of the edge of the bending L&S pattern to the above angle and setting the interval dx in the X direction to a value corresponding to a detection aperture position of the oblique detection optical system, a detection signal intensity of the same pattern by the oblique detection optical system can be maximized.

(6) Other Embodiments

The invention is not limited to the above-described embodiments, and includes various modifications. For example, the embodiments described above have been described in detail for easy understanding of the invention, and the invention is not necessarily limited to those including all the configurations described above. A part of the configuration of one embodiment can be replaced with the configuration of another embodiment, and the configuration of another embodiment can be added to the configuration of one embodiment. In addition, it is possible to add, delete, and replace other configurations for a part of the configuration of each embodiment. Control lines and information lines indicate what is considered necessary for explanation, and not all control lines and information lines in the product are shown. In practice, it may be considered that almost all the configurations are connected to each other.

In regard to each of the above-mentioned configurations, functions, processing units, and the like, a part thereof or an entirety thereof may be achieved by hardware, for example, by being designed as an integrated circuit. Control lines and information lines indicate what is considered necessary for explanation, and not all control lines and information lines in the product are shown. It may be considered that almost all the configurations are actually connected to each other.

Technical elements of the above-mentioned embodiments may be applied alone, or may be applied by being divided into a plurality of parts such as program components and hardware components.

The invention has been described above focusing on the embodiments.

REFERENCE SIGN LIST 101 light source unit
102 objective lens
103 objective pupil optical unit
104 polarizer
105 imaging lens
106 detector
108 mirror
109 two-dimensional detector
110 mirror
111 TTL illumination optical system
112 oblique illumination optical system
113 mirror
151 stage driving unit
152 X-Y-Z-θ stage
170a vertical detection optical system
170b right oblique detection optical system
170c left oblique detection optical system
191 pattern chip
200 signal processing unit
301 overall control unit
302 display unit
303 calculation unit
304 storage unit
601 pattern region
602 pattern sub-region
611 dot line pattern region
612 L&S pattern region
613 dot L&S pattern region
1902 minimum repeating unit region
1903 dot

The invention claimed is:

1. A defect inspection apparatus comprising:
a stage that moves with a sample and a patterned substrate to be inspected placed thereon;
an illumination optical system that emits illumination light being incident on an object on the stage from a direction inclined relative to a normal direction with respect to the patterned substrate and extending in a first direction on the patterned substrate;
a first detection optical system that forms an image on a first detector and detects scattered light generated in the normal direction by irradiation of the illumination light;
a second detection optical system that forms an image on a second detector and detects scattered light emitted in a direction different from a direction of the scattered light detected by the first detection optical system among the scattered light;
a signal processing unit that processes a scattered light signal detected by the first detection optical system and the second detection optical system; and
a control unit, wherein
the control unit implements
first adjustment processing of adjusting a focal position of the first detection optical system or the second detection optical system and a three-dimensional position of each detector with respect to an illumination region of the illumination light by using the scattered light signal obtained in each of the first detection optical system and the second detection optical system, and
second adjustment processing of adjusting a focal point by changing a position in an optical axis direction of a detector of the first detection optical system or the second detection optical system and a position in a height direction of the stage by using the scattered light signal, and
the control unit implements the second adjustment processing at a higher frequency than the first adjustment processing.

2. A defect inspection apparatus comprising:
a stage that moves with a sample and a patterned substrate to be inspected placed thereon;
an illumination optical system that emits illumination light being incident on an object on the stage from a direction inclined relative to a normal direction with respect to the patterned substrate and extending in a first direction on the patterned substrate;
a first detection optical system that forms an image on a first detector and detects scattered light generated in the normal direction by irradiation of the illumination light;
a second detection optical system that forms an image on a second detector and detects scattered light emitted in a direction different from a direction of the scattered light detected by the first detection optical system among the scattered light;
a signal processing unit that processes a scattered light signal detected by the first detection optical system and the second detection optical system; and
a control unit, wherein
the patterned substrate includes a first pattern region detected by the first detection optical system and a second pattern region detected by the first detection optical system and the second detection optical system,
the control unit implements
first adjustment processing of adjusting a focal position of the first detection optical system or the second detection optical system and a three-dimensional position of each detector with respect to an illumination region of the illumination light by using the scattered light signal obtained in each of the first detection optical system and the second detection optical system, and
second adjustment processing of adjusting a focal point by changing a position in an optical axis direction of a detector of the first detection optical system or the second detection optical system and a position in a height direction of the stage by using the scattered light signal,
the control unit uses a detected scattered light signal related to the first pattern region in the first adjustment processing, and
the control unit implements the second adjustment processing at a higher frequency than the first adjustment processing.

3. The defect inspection apparatus according to claim 2, wherein the first pattern region includes a line and space pattern in a direction orthogonal to an incidence direction of illumination light by the illumination optical system.

4. The defect inspection apparatus according to claim 2, wherein
the first pattern region includes a plurality of line and space patterns in a direction orthogonal to an incidence direction of illumination light by the illumination optical system, and
the line and space patterns are different in height in a normal direction of a surface of the stage.

5. The defect inspection apparatus according to claim 2, wherein
the second pattern region includes a region in which a plurality of geometric patterns that generate scattered or diffracted light when the illumination light is emitted are arranged in a row direction which is a first direction and a column direction which is a second direction orthogonal to the first direction,
the geometric patterns have a minimum interval in the column direction that is smaller than a width of the illumination light, and
in any of the first detection optical system and the second detection optical system, an interval in the row direction is larger than a pitch of pixels of each detection optical system, and
the control unit uses a detected scattered light signal related to the second pattern region in the second adjustment processing.

6. The defect inspection apparatus according to claim 2, wherein
the second pattern region includes arrangement regions in which a plurality of geometric patterns that generate scattered or diffracted light when the illumination light is emitted are arranged in a row direction which is a first direction and a column direction which is a second direction orthogonal to the first direction,
the geometric patterns have a minimum interval in the column direction that is smaller than a width of the illumination light, and
in any of the first detection optical system and the second detection optical system, an interval in the row direction is larger than a pitch of pixels of each detection optical system,
the arrangement regions are different in height in a normal direction of a surface of the stage, and
the control unit uses a detected scattered light signal related to the second pattern region in the second adjustment processing.

\* \* \* \* \*